(12) United States Patent
Murshid et al.

(10) Patent No.: US 11,201,678 B2
(45) Date of Patent: Dec. 14, 2021

(54) SYSTEM FOR ACHIEVING MULTIPLE BITS PER SYMBOL IN OPTICAL COMMUNICATIONS SYSTEMS BY COMBINING SPATIAL DOMAIN MULTIPLEXING AND PULSE AMPLITUDE MODULATION

(71) Applicant: Florida Institute of Technology, Inc., Melbourne, FL (US)

(72) Inventors: Syed H. Murshid, Palm Bay, FL (US); Greg Lovell, Melbourne, FL (US); Bilas Chowdhury, Melbourne, FL (US); Ce Su, Melbourne, FL (US); Han Wang, Melbourne, FL (US); Rayan Enaya, Melbourne, FL (US); Engin Eyceyurt, Sivas (TR)

( * ) Notice: Subject to any disclaimer, the term of this patent is extended or adjusted under 35 U.S.C. 154(b) by 0 days.

(21) Appl. No.: 17/102,735

(22) Filed: Nov. 24, 2020

(65) Prior Publication Data
US 2021/0152252 A1 May 20, 2021

Related U.S. Application Data

(62) Division of application No. 16/367,238, filed on Mar. 27, 2019, now Pat. No. 10,998,980.
(Continued)

(51) Int. Cl.
*H04J 14/04* (2006.01)
*H04J 14/02* (2006.01)
(Continued)

(52) U.S. Cl.
CPC .......... *H04B 10/524* (2013.01); *H04B 10/25* (2013.01); *H04B 10/541* (2013.01); *H04B 10/69* (2013.01);
(Continued)

(58) Field of Classification Search
CPC .... H04B 10/25; H04B 10/524; H04B 10/541; H04B 10/69; H04J 14/04; H04J 14/0205; H04J 14/0213
(Continued)

(56) References Cited

U.S. PATENT DOCUMENTS

| 8,452,189 B2 * | 5/2013 | Schunk | H04B 10/541 |
| | | | 398/189 |
| 8,977,121 B2 * | 3/2015 | Djordjevic | H04J 14/0201 |
| | | | 398/44 |

(Continued)

*Primary Examiner* — Li Liu
(74) *Attorney, Agent, or Firm* — Lowndes; Stephen C. Thomas

(57) ABSTRACT

A modified optical PAM communication system using multiple laser sources to generate each amplitude level. The systems can be applied separately or in conjunction with another modulation system such as SDM, MDM, WDM, TDM, or other communication systems. In an embodiment, a PAM-4 system will increase data rate by a factor of two, but more complicated schemes using more lasers can be utilized to generate higher efficiency schemes. For example, a 25 Gbps NRZ signal will give 50 Gbps PAM-4 signal and higher laser systems can generate PAM-8 or PAM-16 for 75 and 100 Gbps systems respectively. These can be further applied to SDM systems to generate higher data rates equivalent to the number of SDM channels multiplied by the PAM efficiency. In embodiments, the invention may combing PAM with WDM and SDM to achieve multiple bits per symbol.

9 Claims, 42 Drawing Sheets

Related U.S. Application Data

(60) Provisional application No. 62/648,486, filed on Mar. 27, 2018.

(51) Int. Cl.
    *H04B 10/54*       (2013.01)
    *H04B 10/524*     (2013.01)
    *H04B 10/25*       (2013.01)
    *H04B 10/69*       (2013.01)

(52) U.S. Cl.
    CPC ...... *H04J 14/0205* (2013.01); *H04J 14/0213* (2013.01); *H04J 14/04* (2013.01)

(58) Field of Classification Search
    USPC ............................. 398/44, 74, 142, 186, 189
    See application file for complete search history.

(56) References Cited

U.S. PATENT DOCUMENTS

| | | | |
|---|---|---|---|
| 9,094,125 B2* | 7/2015 | Djordjevic | H04B 10/516 |
| 10,033,477 B2* | 7/2018 | Bratkovski | H04J 14/04 |
| 10,187,157 B2* | 1/2019 | Nakahara | G02B 6/29344 |
| 10,236,952 B1* | 3/2019 | Sadot | H04W 52/42 |
| 2002/0181063 A1* | 12/2002 | Kropp | H04B 10/506 |
| | | | 398/182 |
| 2003/0123122 A1* | 7/2003 | Nakamura | H04B 10/505 |
| | | | 359/248 |
| 2010/0260505 A1* | 10/2010 | Dahan | H04B 10/505 |
| | | | 398/183 |
| 2012/0183290 A1* | 7/2012 | Schunk | G02B 6/4206 |
| | | | 398/43 |
| 2012/0207470 A1* | 8/2012 | Djordjevic | H04J 14/0201 |
| | | | 398/44 |
| 2014/0029941 A1* | 1/2014 | Bratkovski | H04J 14/04 |
| | | | 398/43 |
| 2014/0199065 A1* | 7/2014 | Bratkovski | H04J 14/04 |
| | | | 398/44 |
| 2014/0205283 A1* | 7/2014 | Djordjevic | H04B 10/516 |
| | | | 398/44 |
| 2014/0321863 A1* | 10/2014 | Diab | H04B 10/272 |
| | | | 398/185 |
| 2017/0257170 A1* | 9/2017 | Nakahara | G02B 6/29344 |
| 2019/0149236 A1* | 5/2019 | Wang | H04Q 11/0071 |
| | | | 398/48 |
| 2019/0173604 A1* | 6/2019 | Xie | H04J 14/04 |
| 2019/0288786 A1* | 9/2019 | Nagarajan | H04B 10/40 |

* cited by examiner

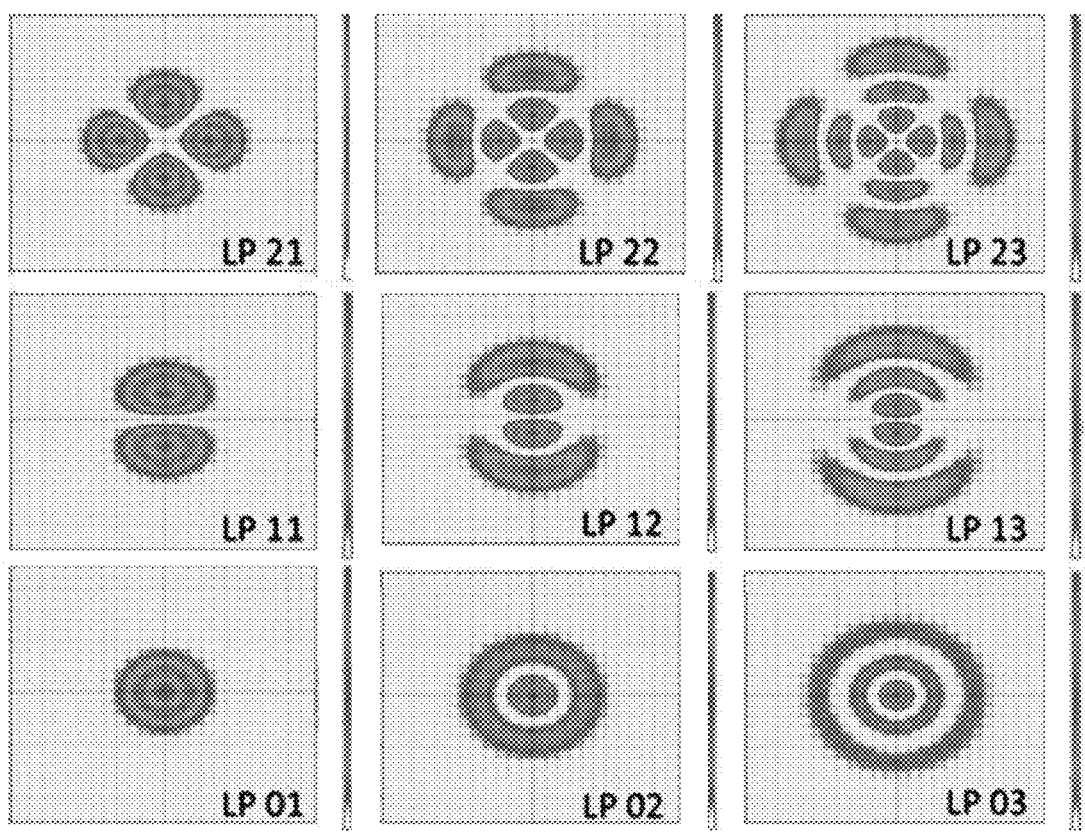
Fig. 1 LP Modes

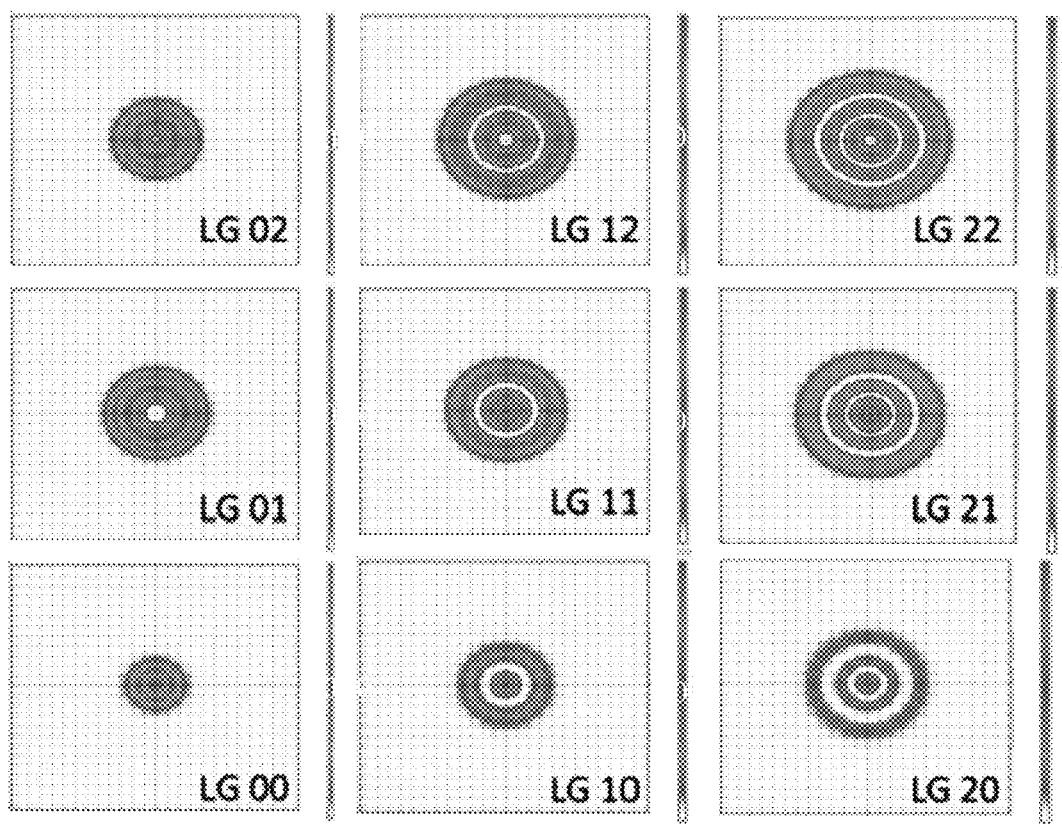
Fig. 2 LC Modes

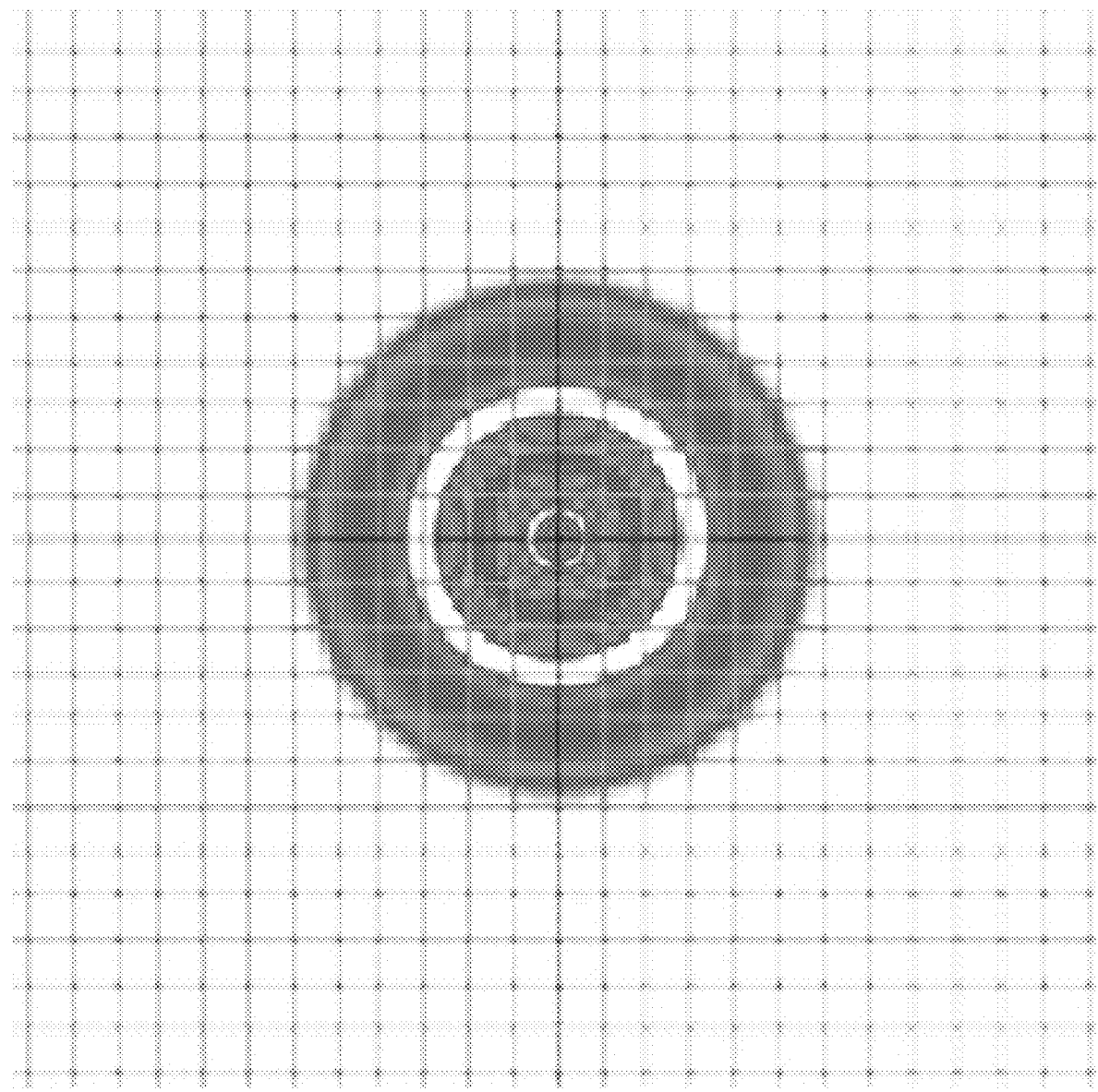
Fig. 3  The mixed mode by $LG_{00}$ and $LG_{12}$

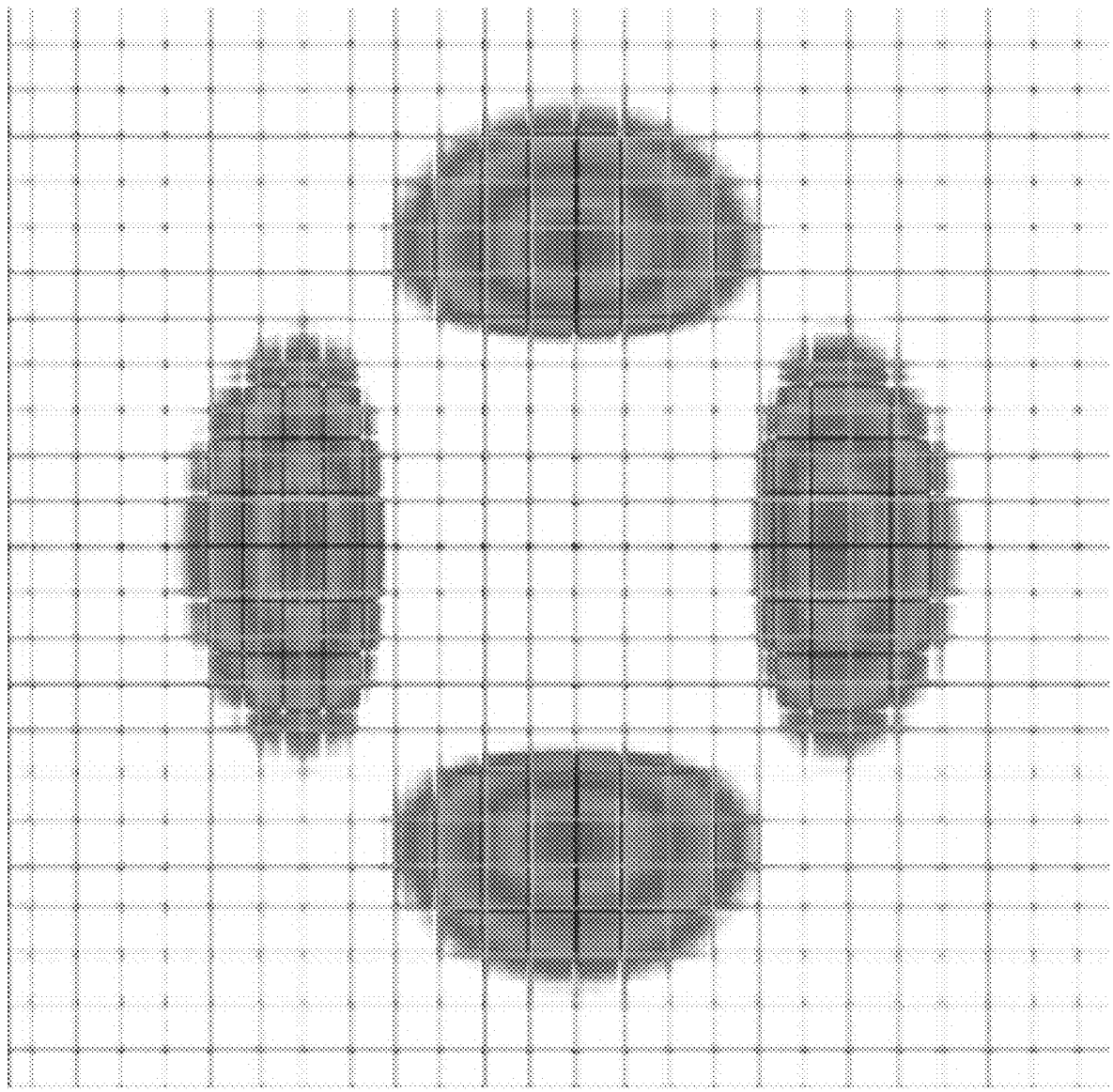
Fig. 4  The mixed mode by $LG_{11x}$ and $LG_{11y}$

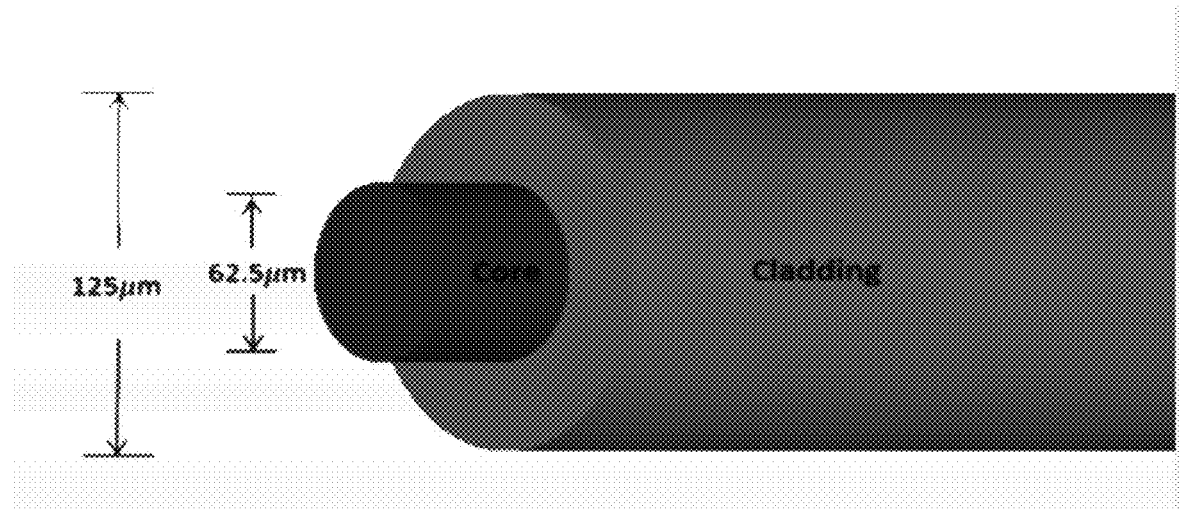
Fig. 5A Standard multi-mode fiber
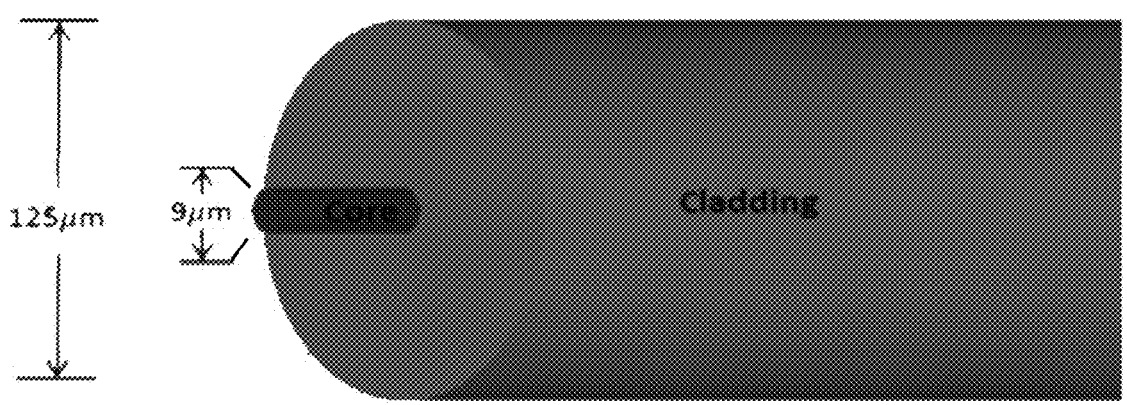
Fig. 5B Standard single-mode fiber

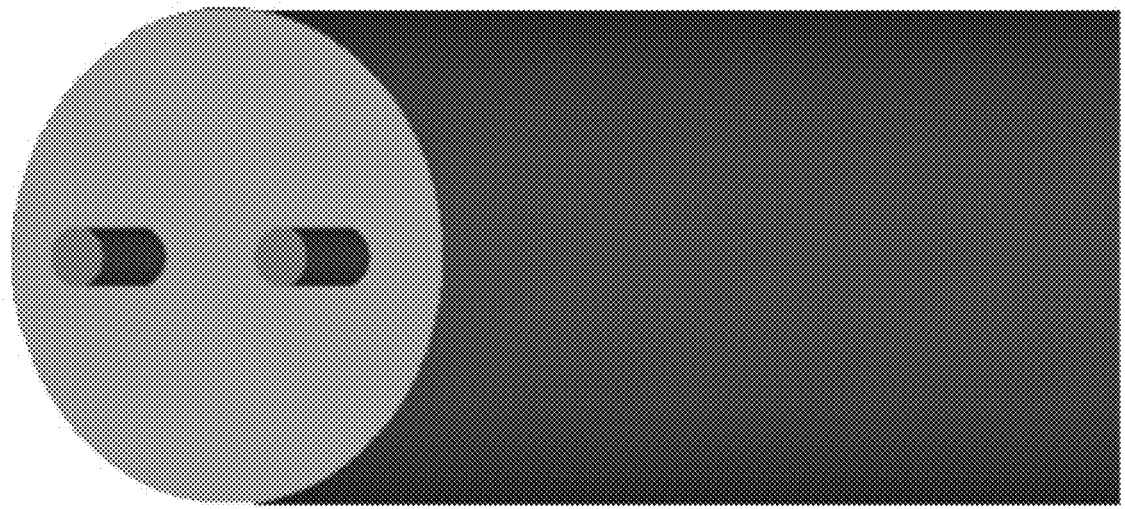
Fig. 6A Multi-core fiber, two optical cores
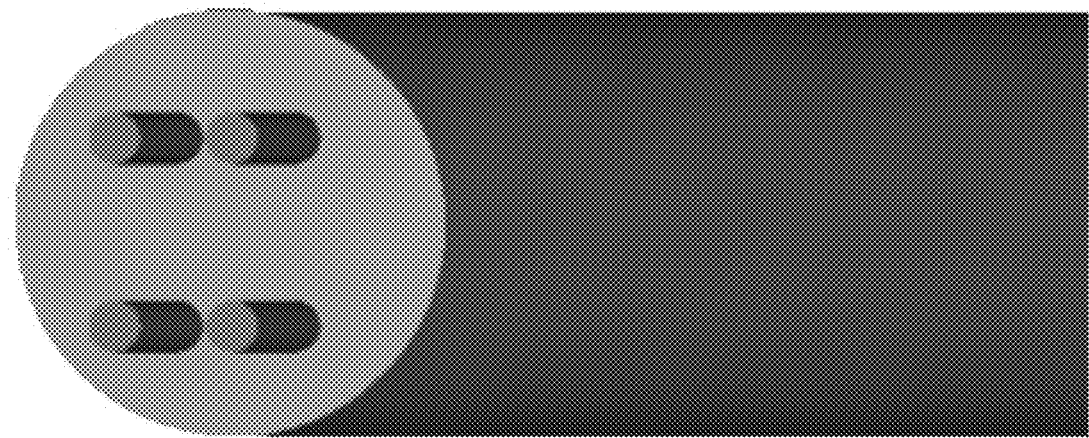
Fig. 6B Multi-core fiber, four optical cores

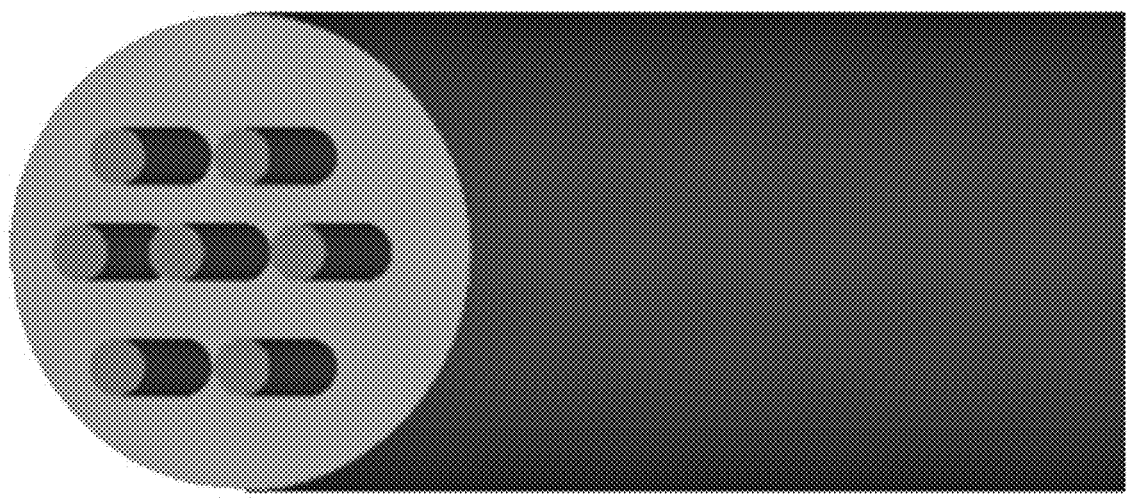
Fig. 6C Multi-core fiber, seven optical cores

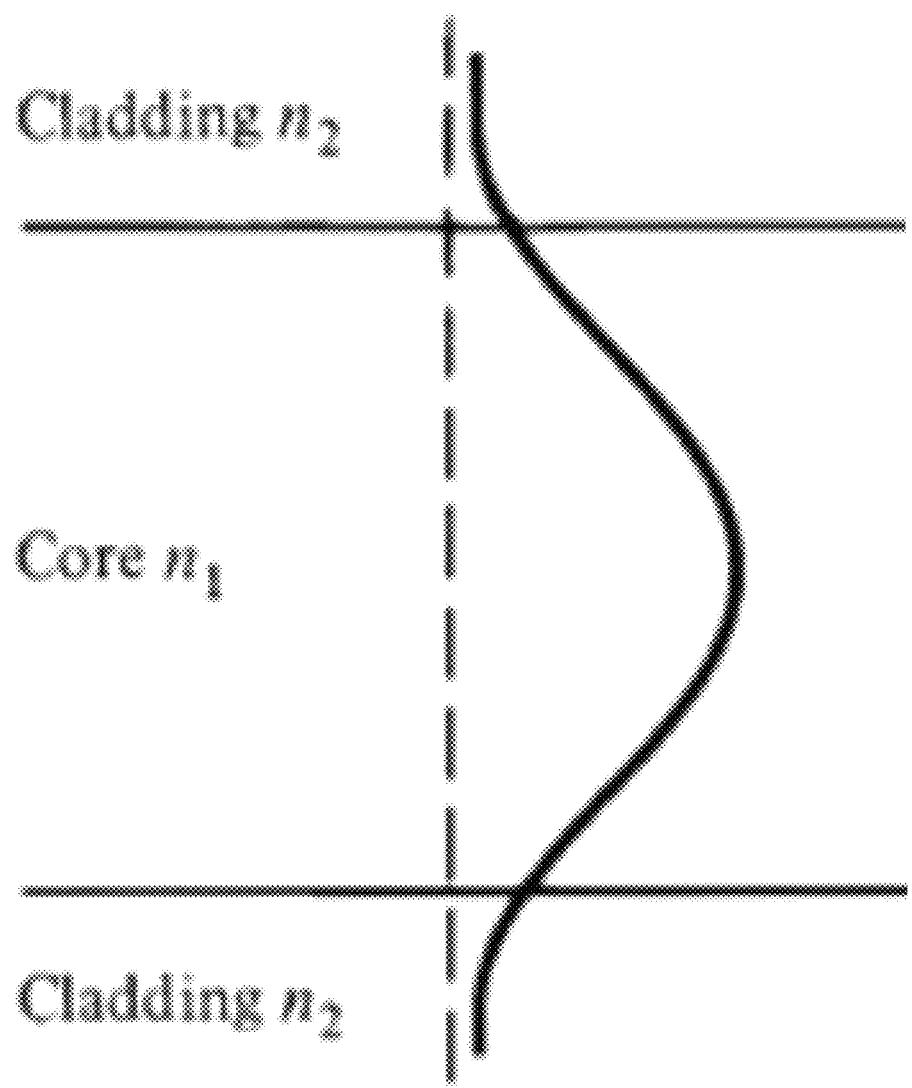
Fig. 7 E-field propagation inside optical fiber

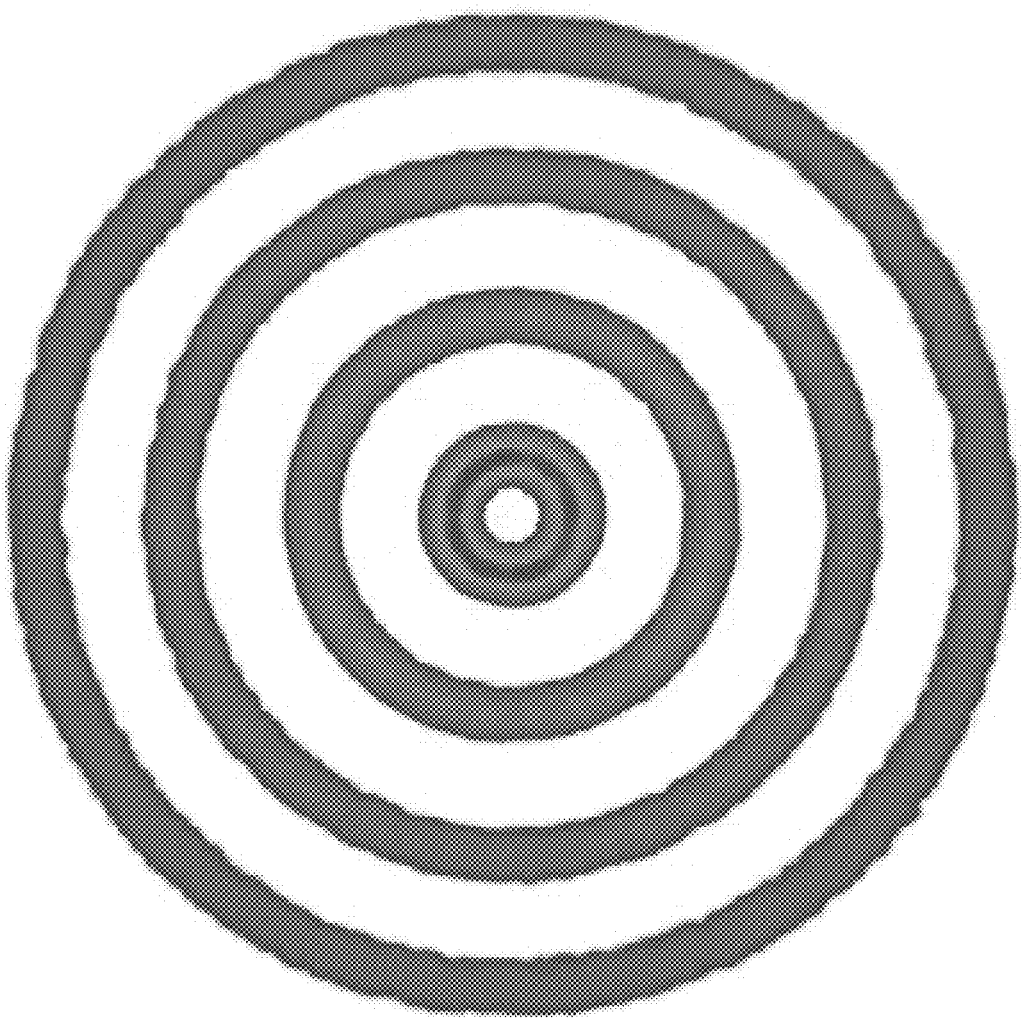
Fig. 8 Optical output profile of SDM

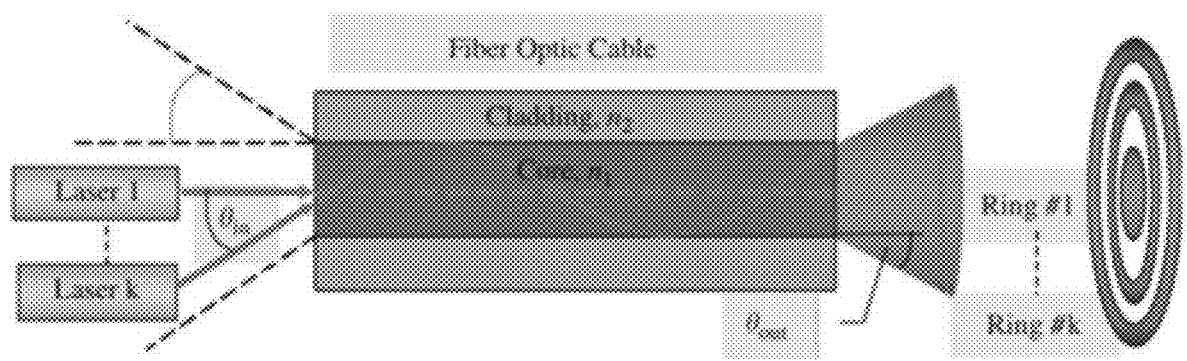
Fig. 9  Exemplary SDM system layout

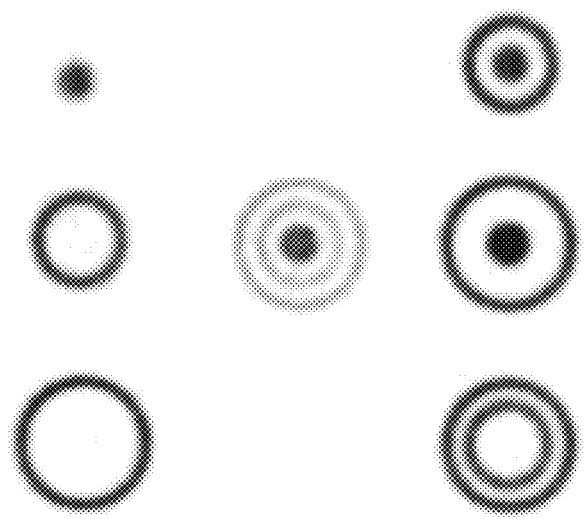
Fig. 10  The combination of SDM output rings
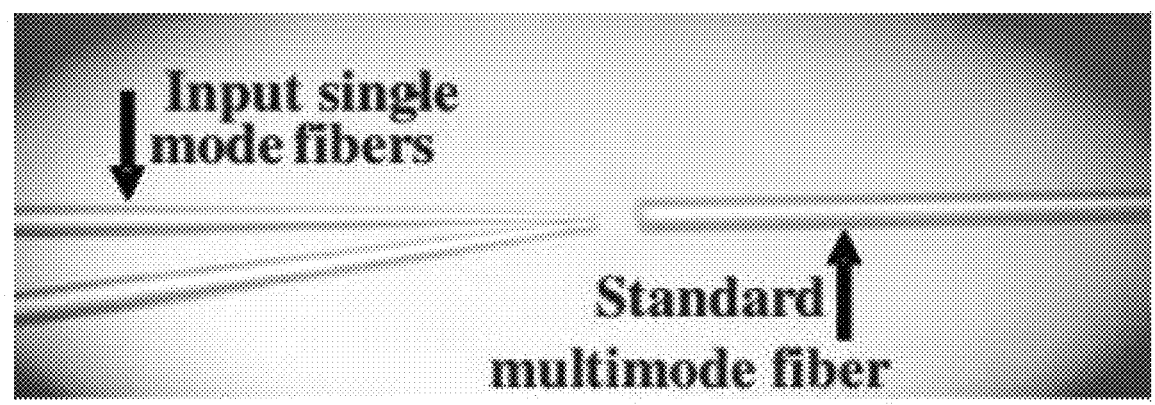
Fig. 11  SDM input into a carrier fiber

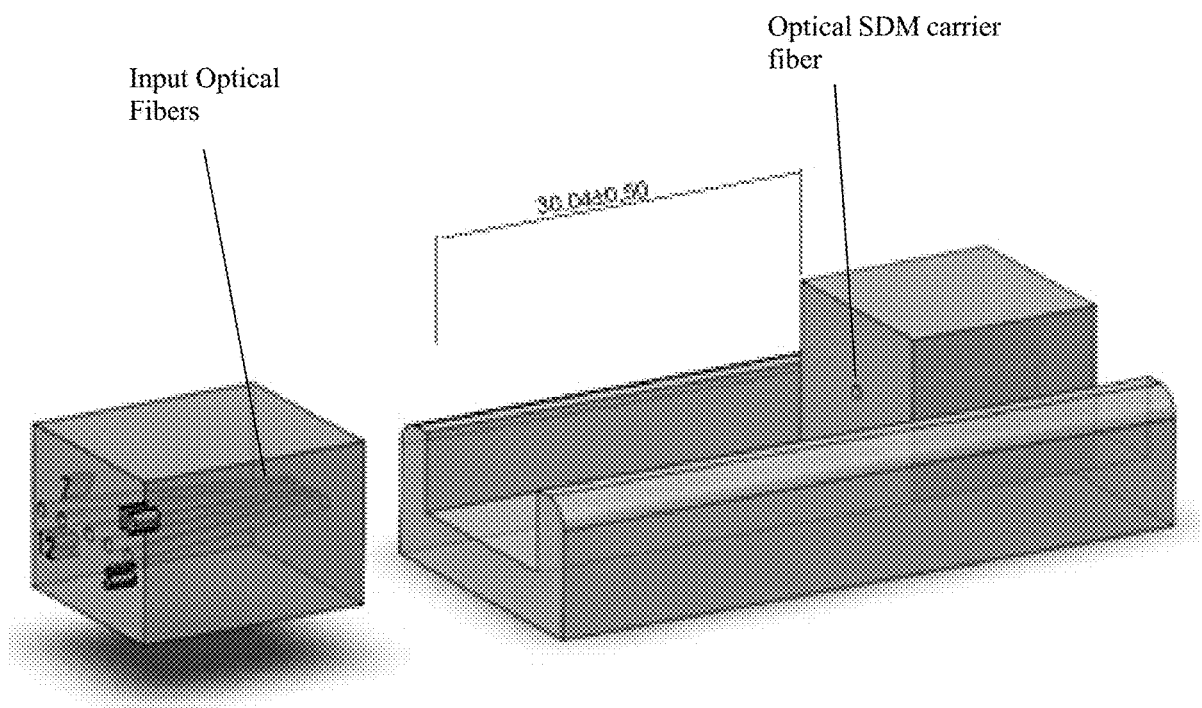
Fig. 12 3-D Printed SDM Multiplexer Example
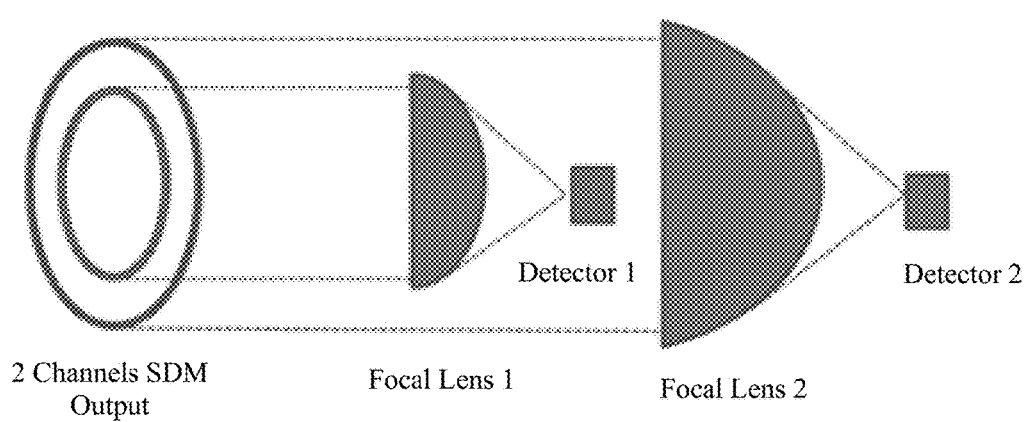
FIG. 13 Bulk lens for de-multiplexing SDM

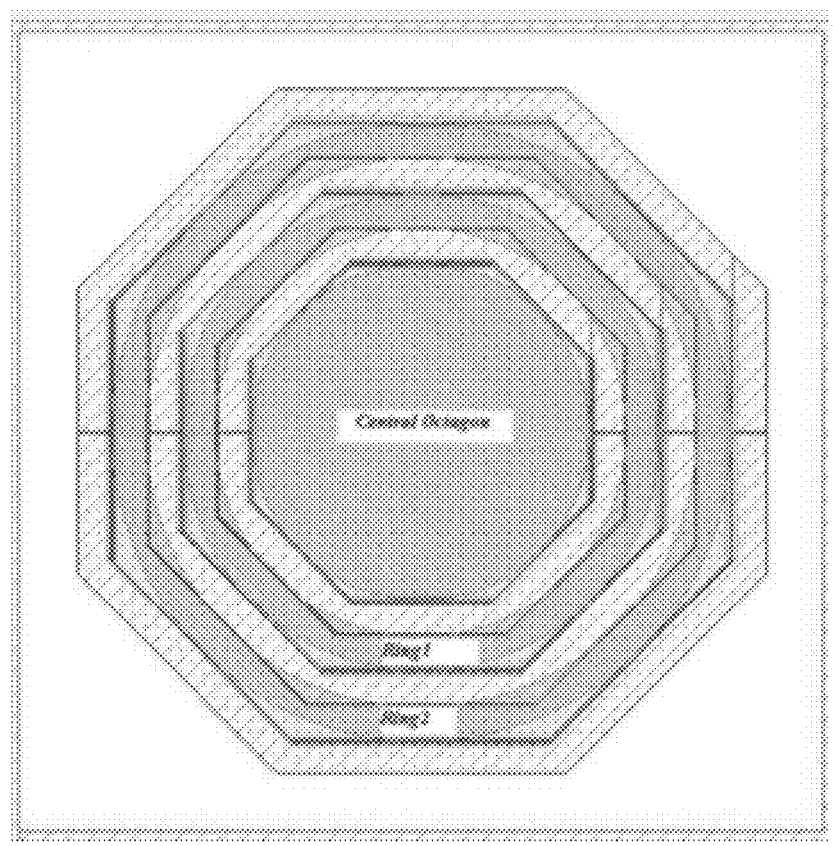
Fig. 14 Concentric rings CMOS SDM optical detector

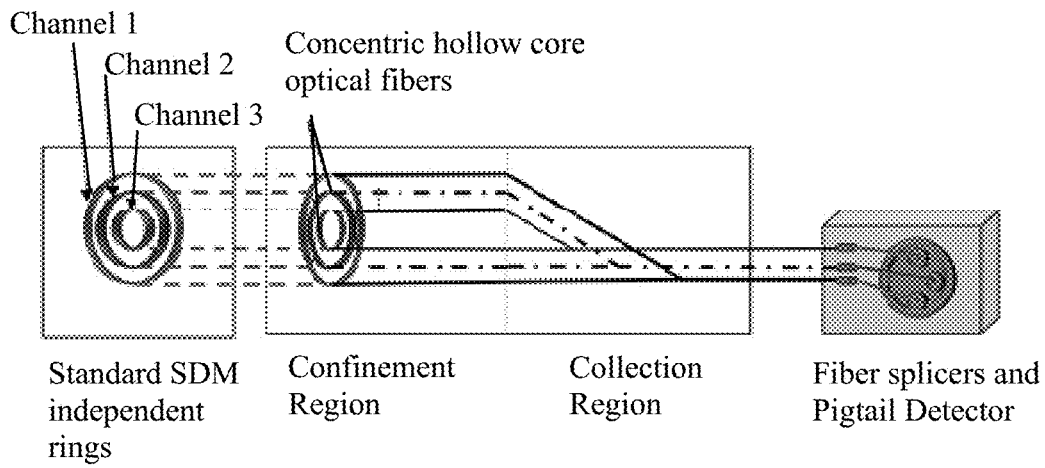
FIG. 15 Hollow Core Fiber
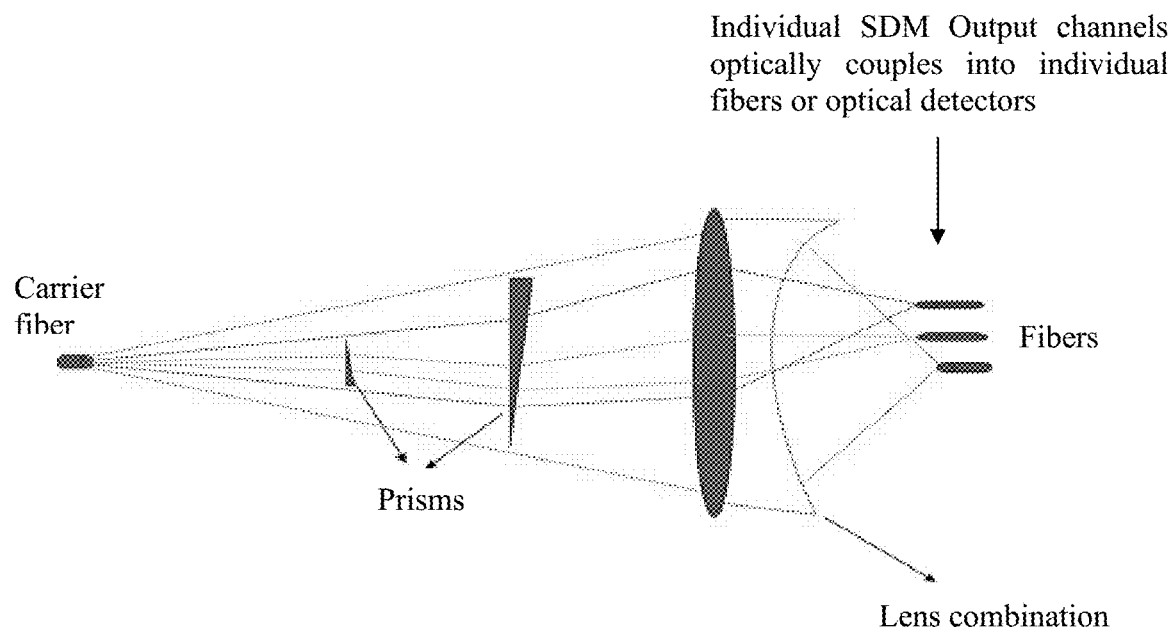
FIG. 16 Multi-Prism SDM Demultiplexer

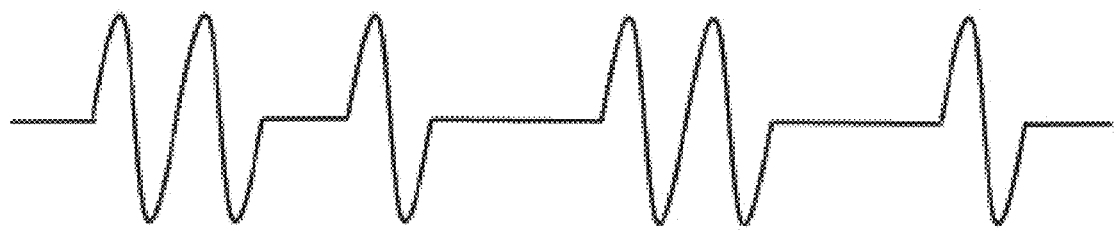
Fig. 17 OOK system
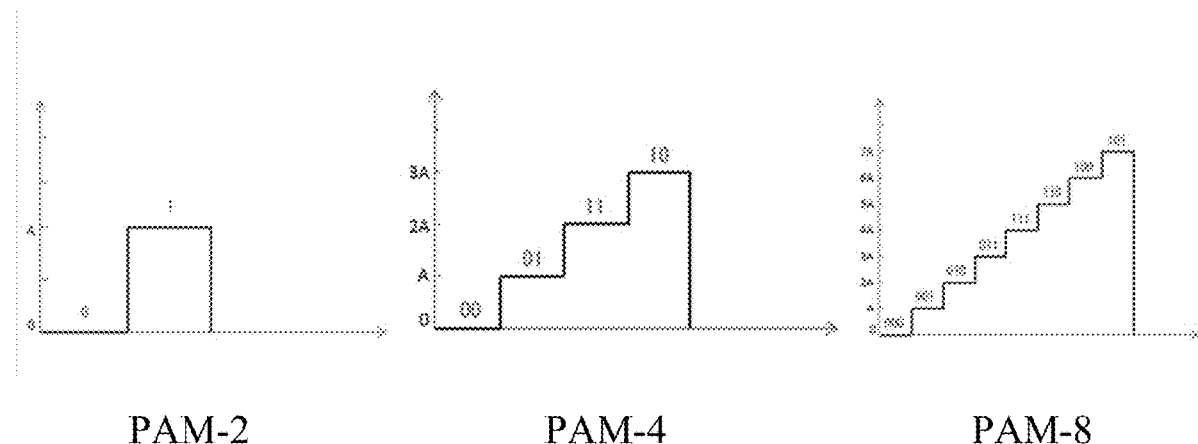
Fig. 18 PAM-2, -4, and -8

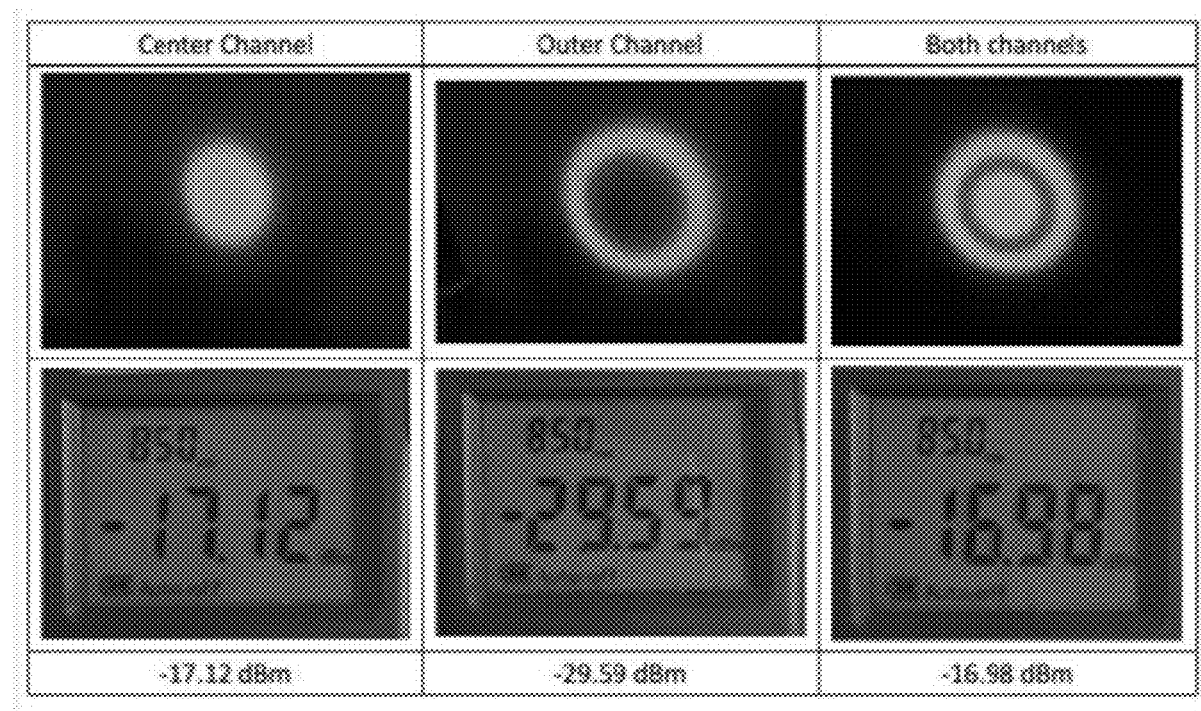
Fig. 19 Addition of individual SDM channel intensity

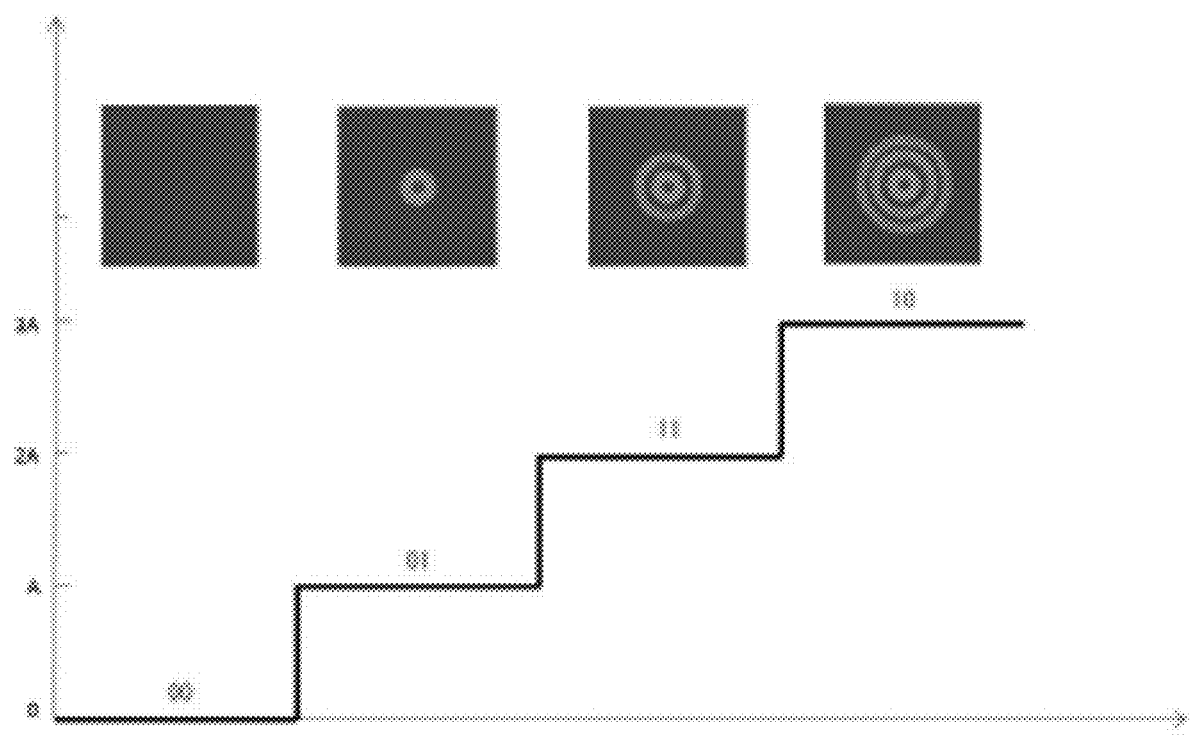
Fig. 20 Modified PAM-4 system

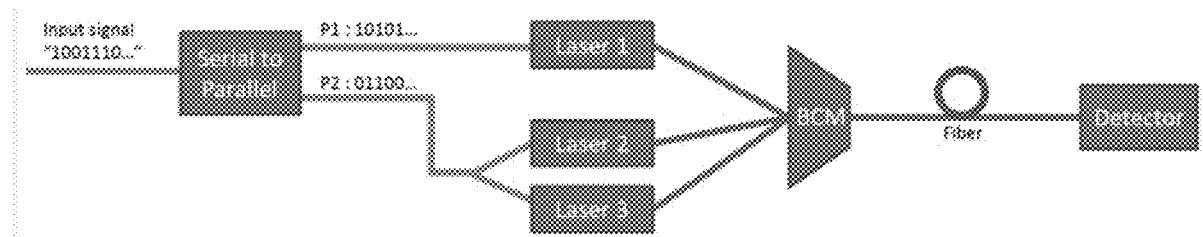
Fig. 21A  PAM-4 system

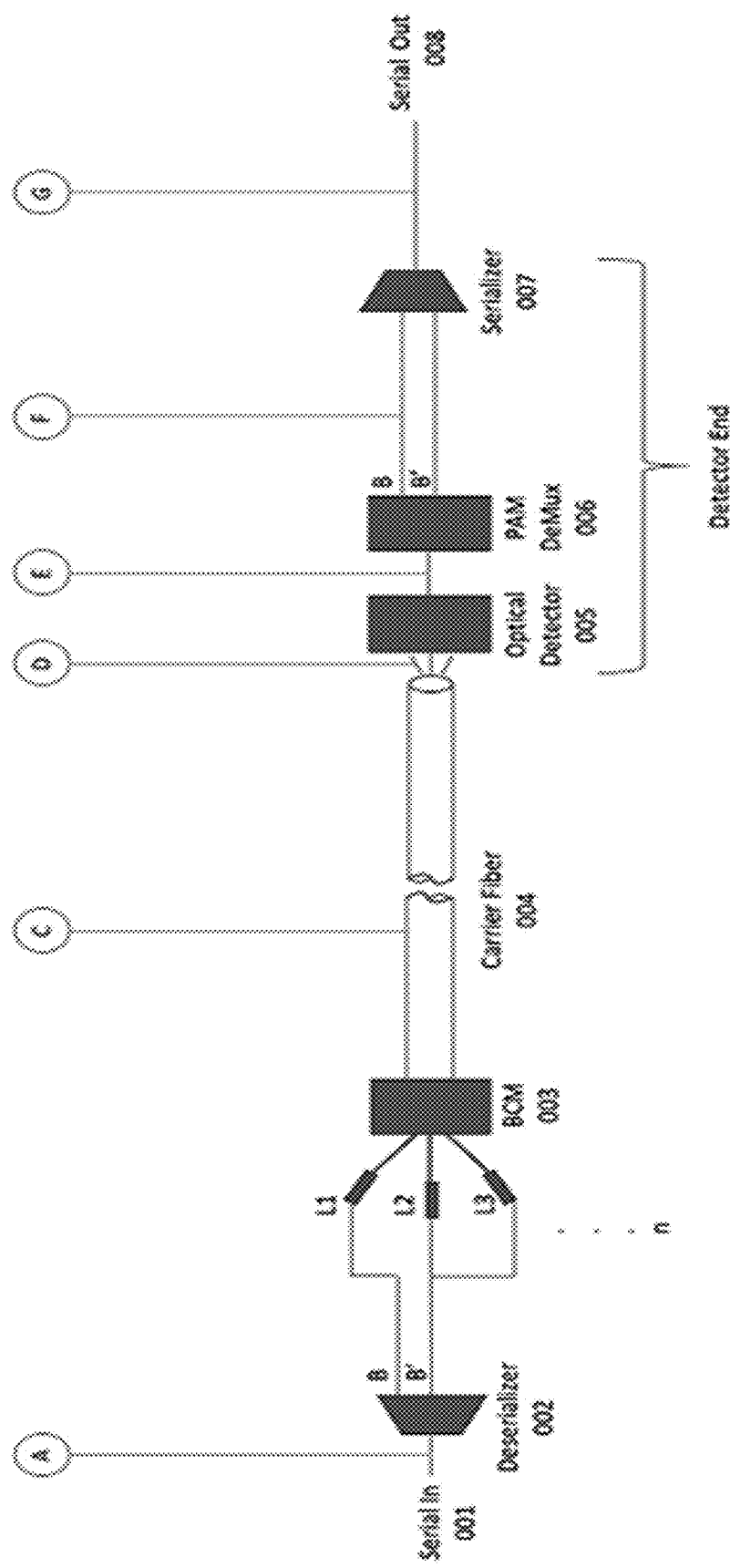
FIG. 21B  PAM

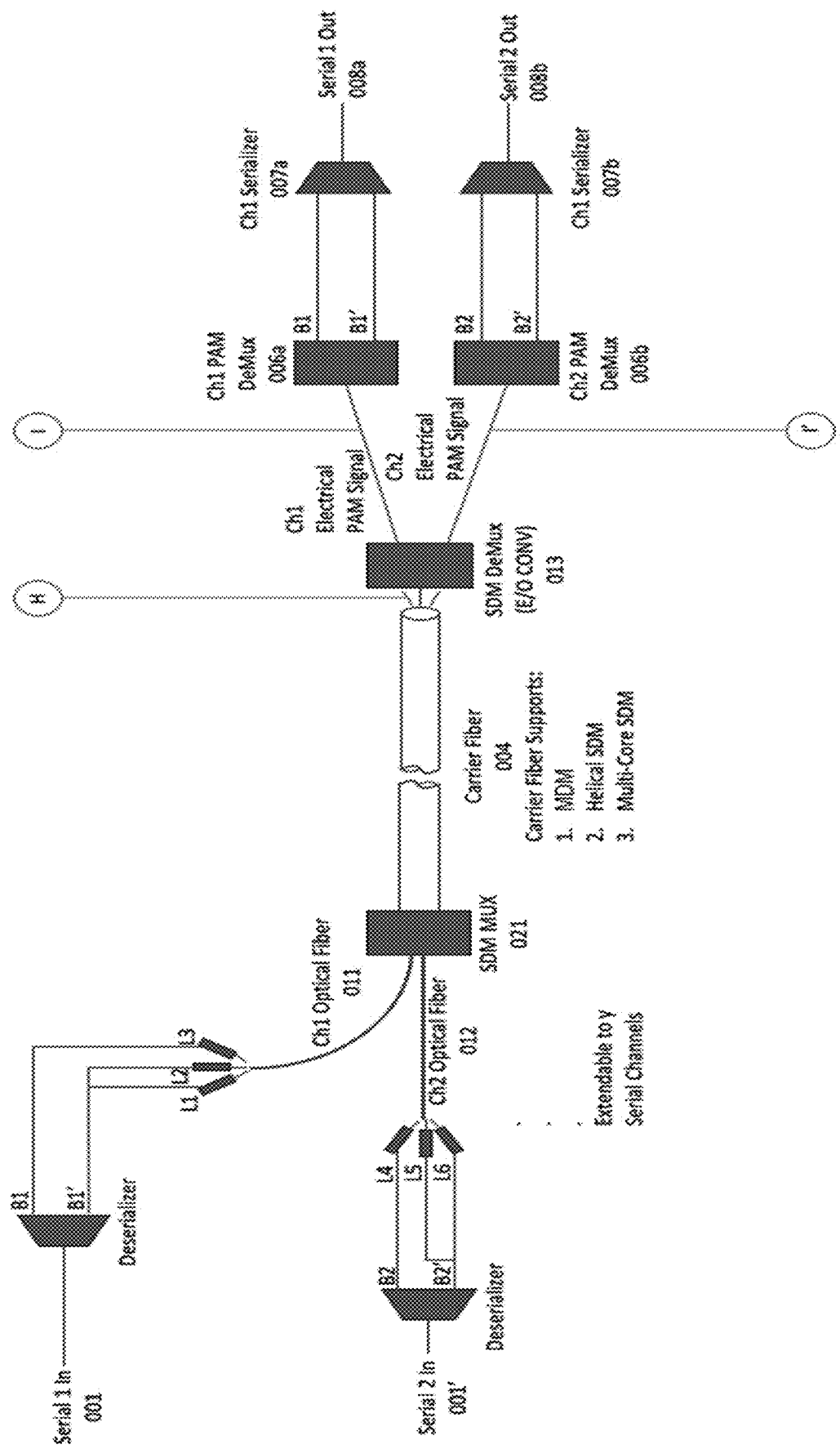
FIG. 21C  PAM/SDM EACH SDM CHANNEL CARRIES PAM-X SIGNAL

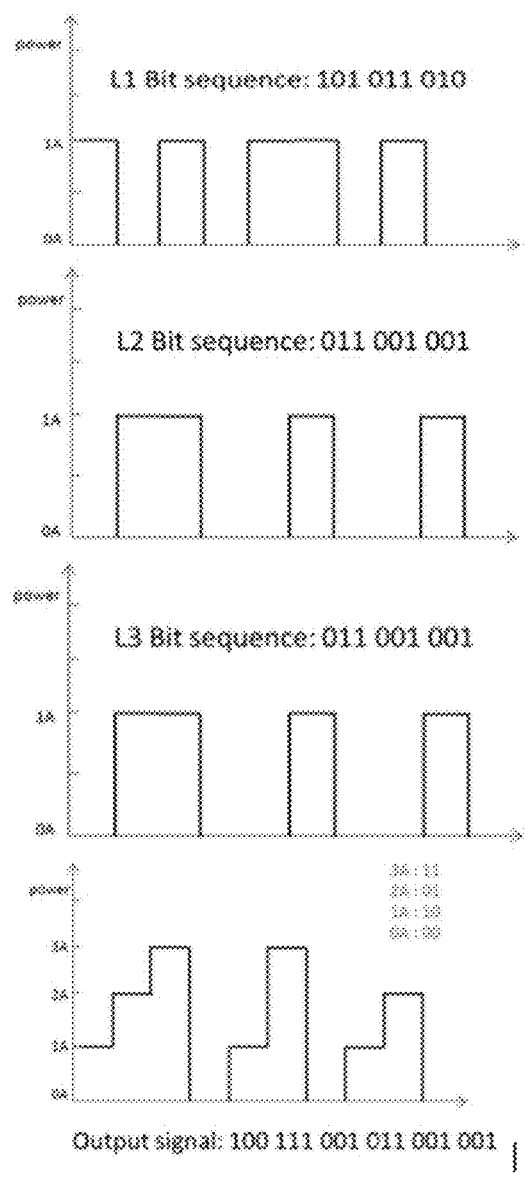
Fig. 22  Entire process to PAM-4 system

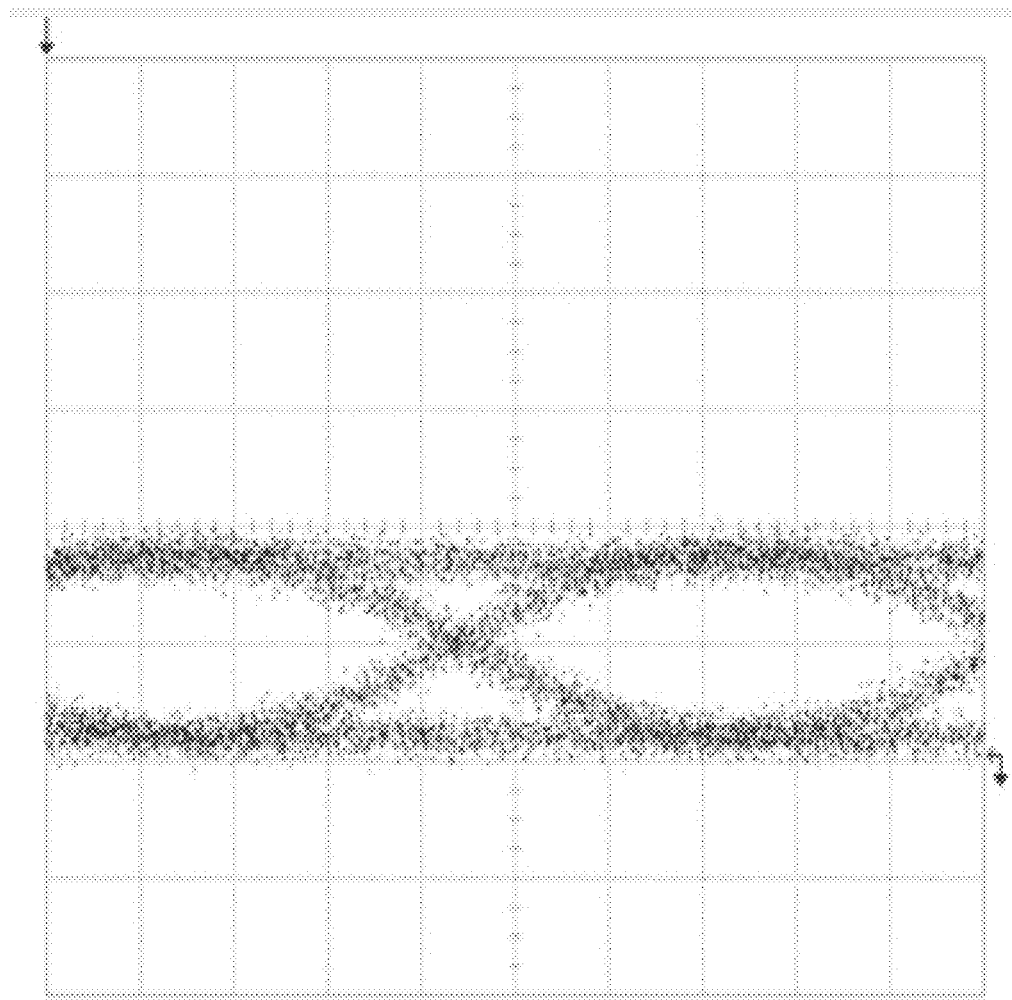
Fig. 23A  Eye diagram of PAM-2 system

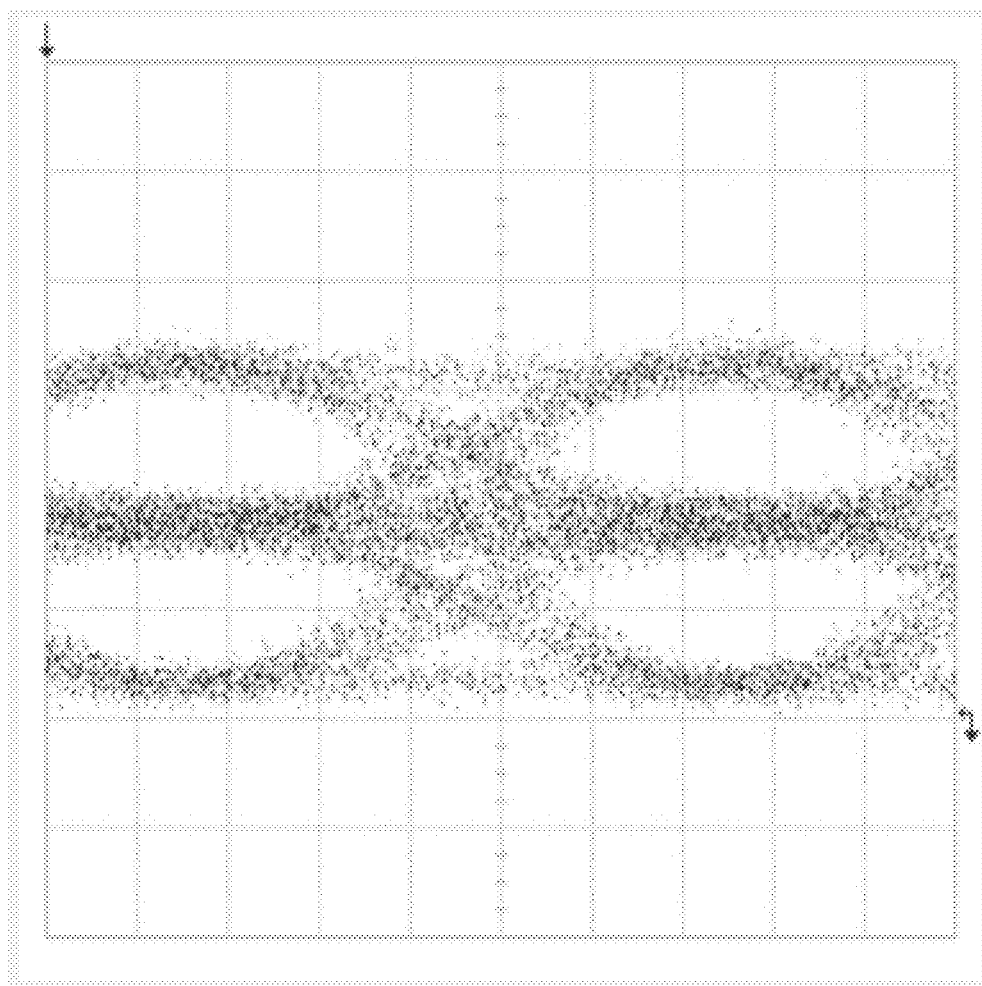
Fig. 23B Eye diagram of PAM-3 system

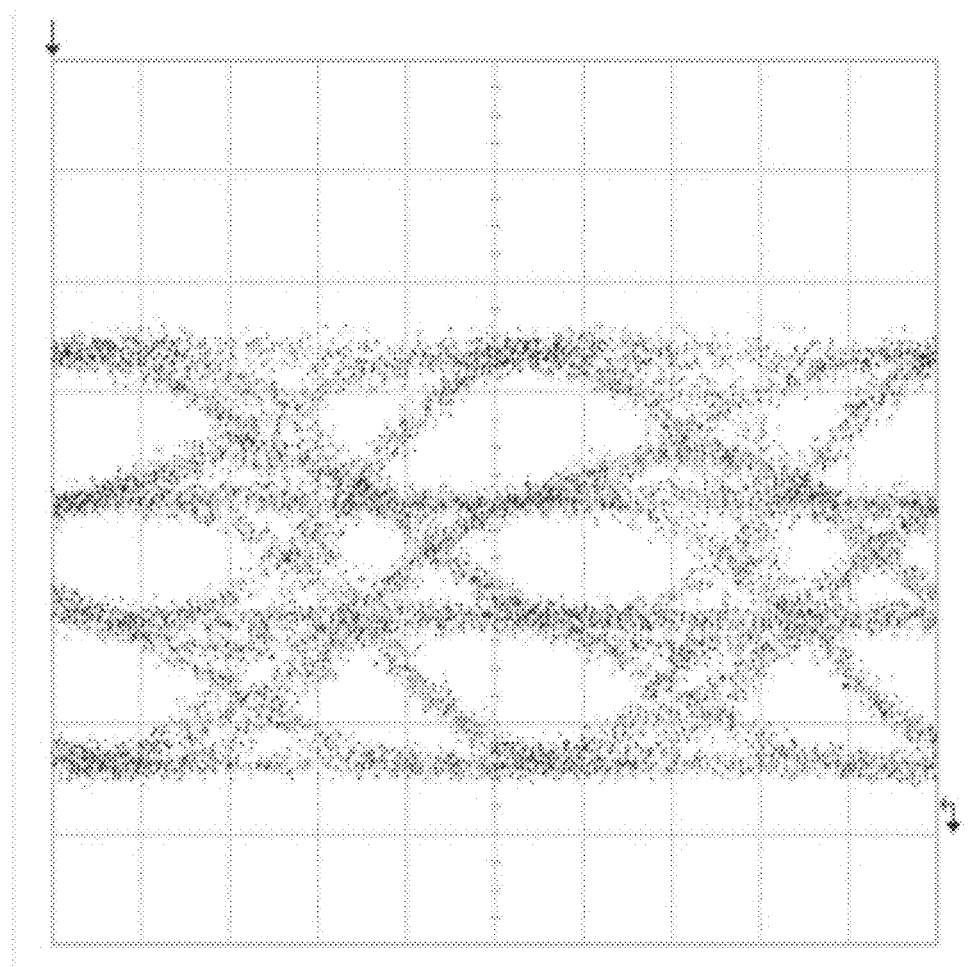
Fig. 23C  Eye diagram of PAM-4 system

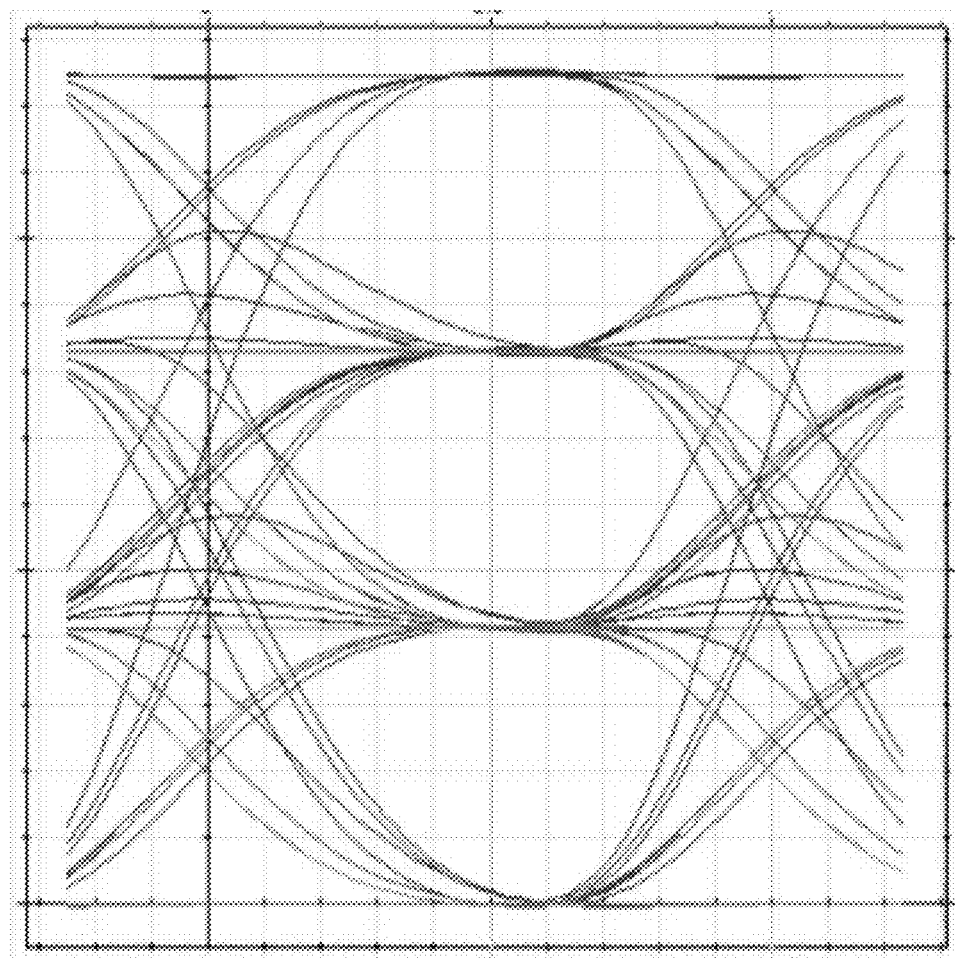
Fig. 24 Simulation results for Modified PAM-4 at 850nm

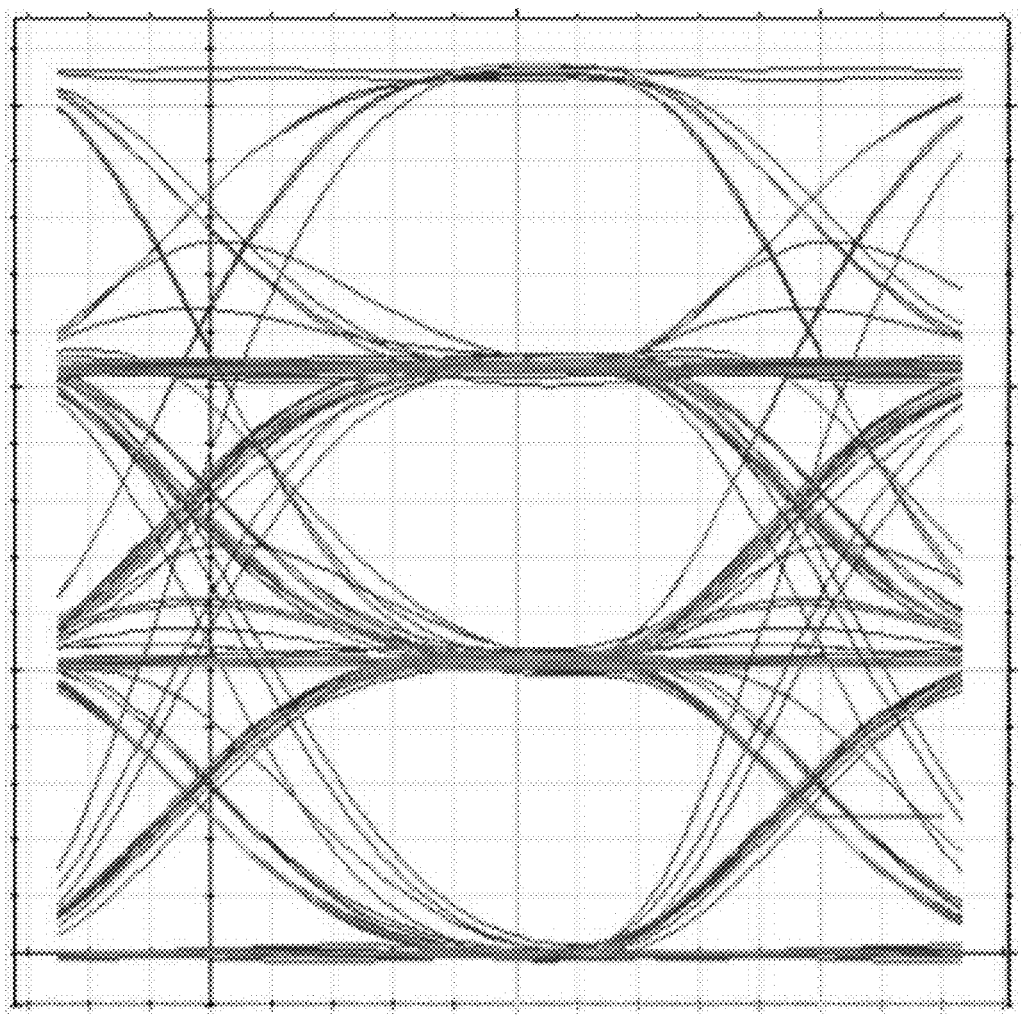
Fig. 25 Simulation results for Modified PAM-4 at 1310nm

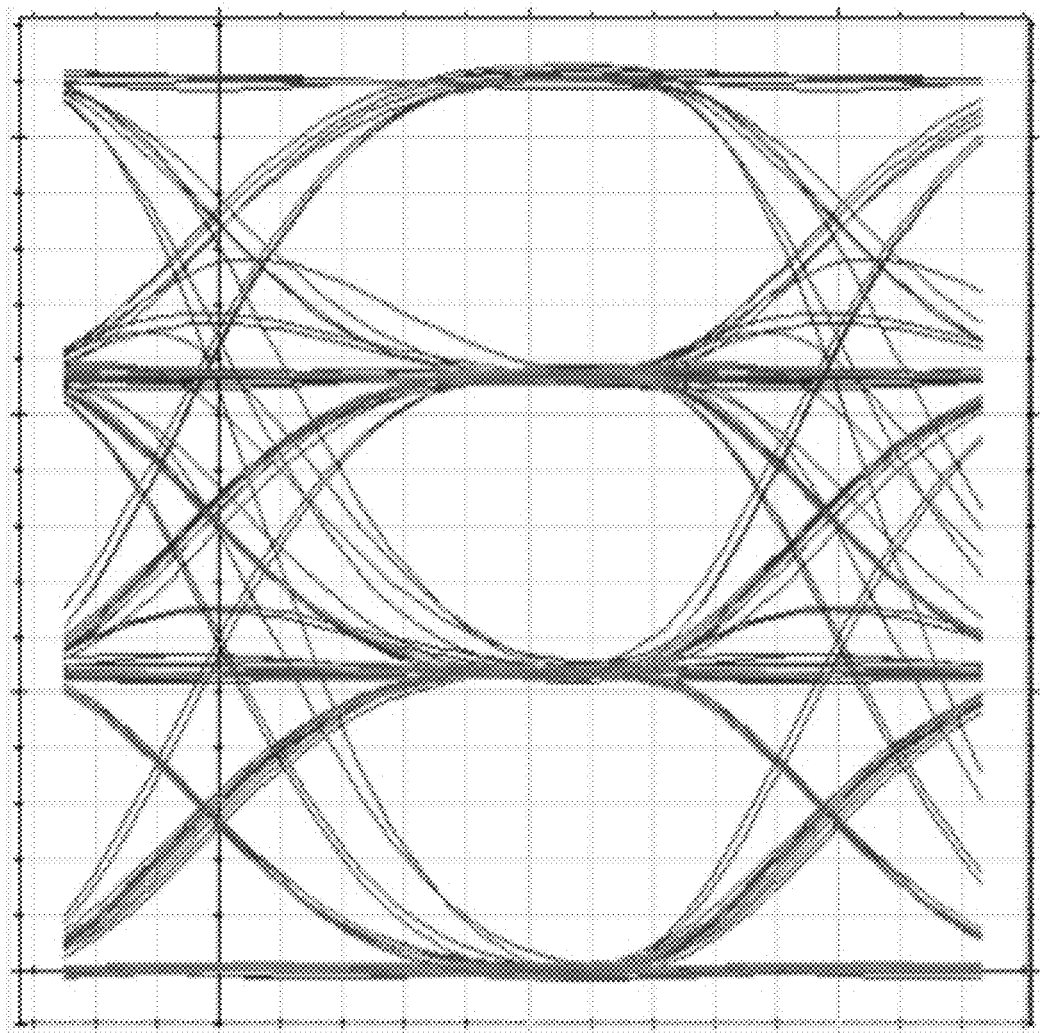
Fig. 26 Simulation results for Modified PAM-4 at 1550nm

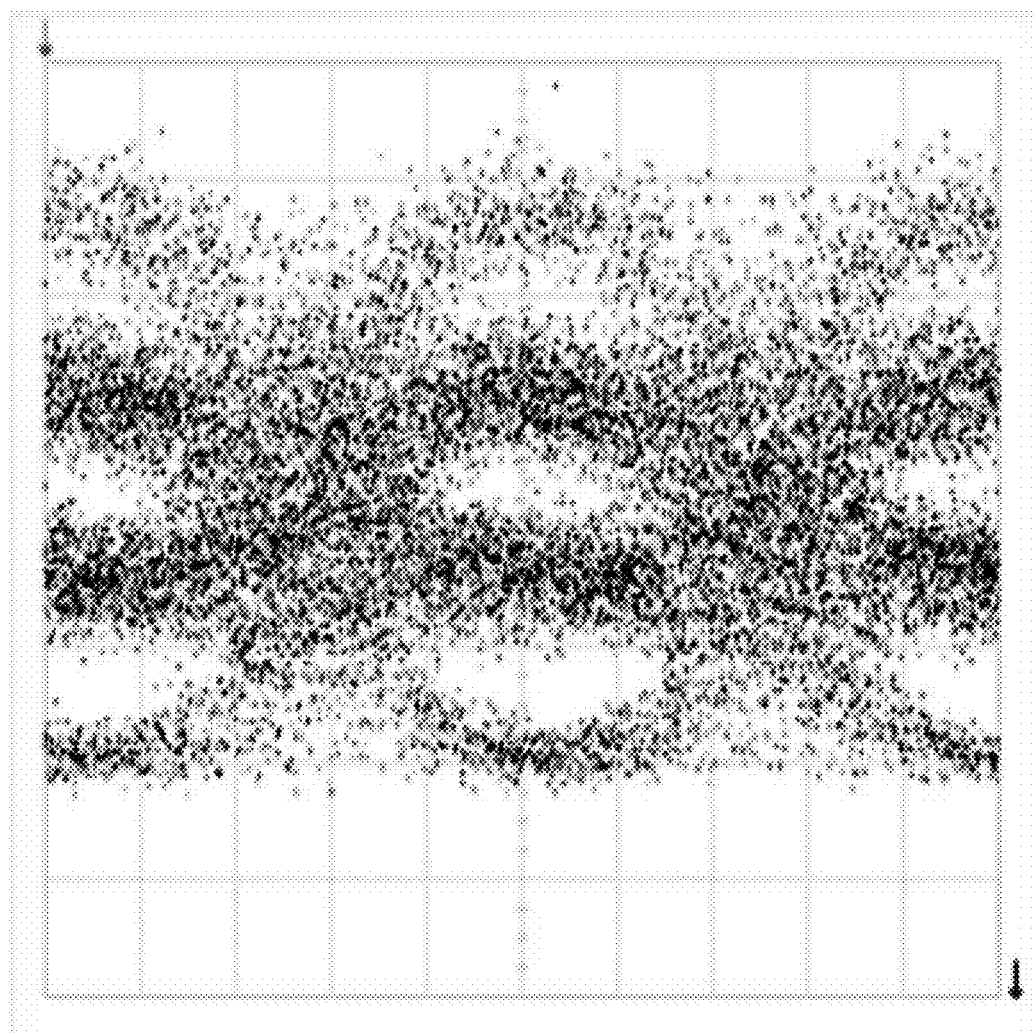
Fig. 27 Reference PAM-4 input signal

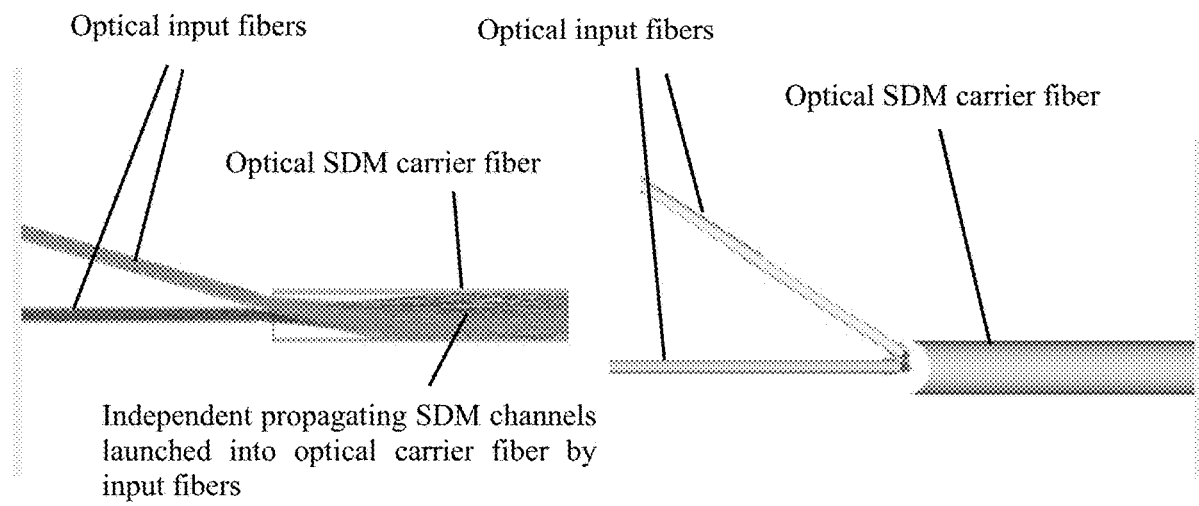
Fig. 28 Modified PAM SDM launch into optical carrier fiber

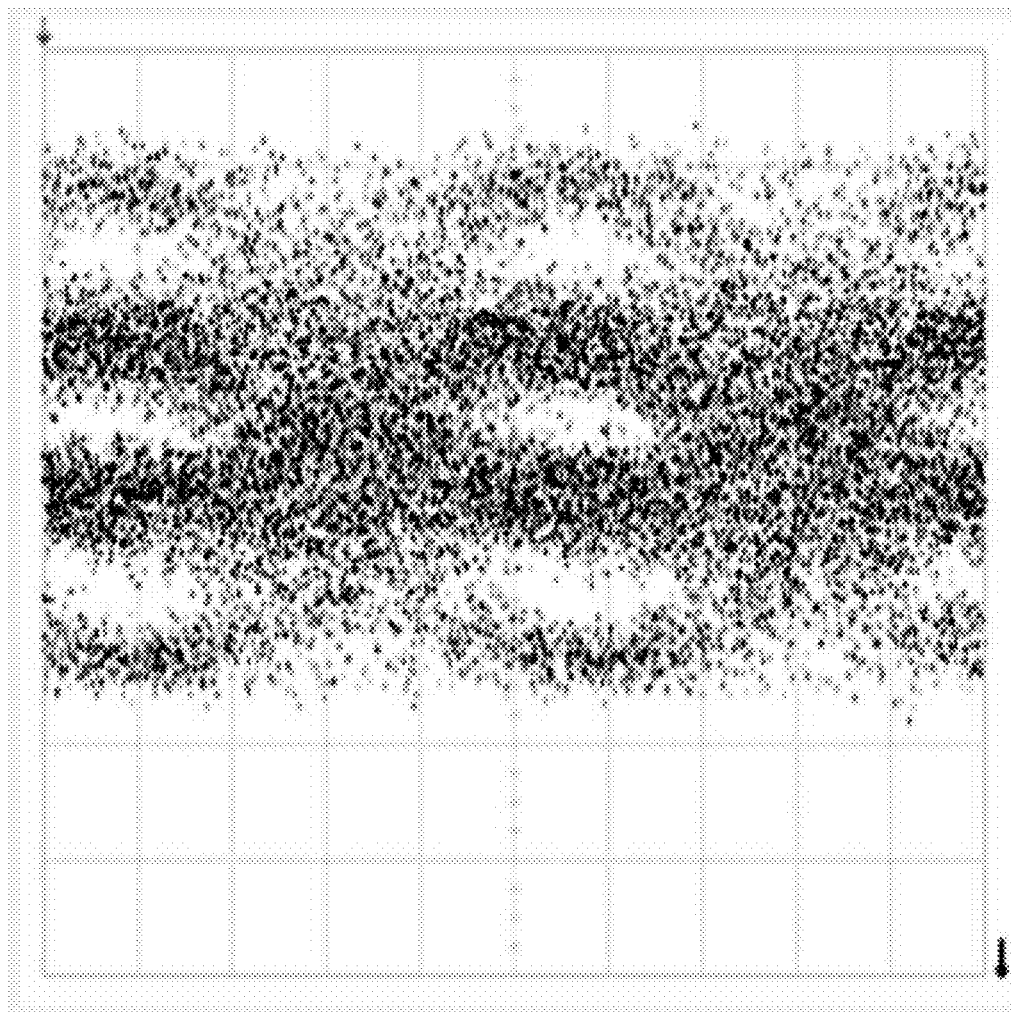
Fig. 29 Center SDM channel output

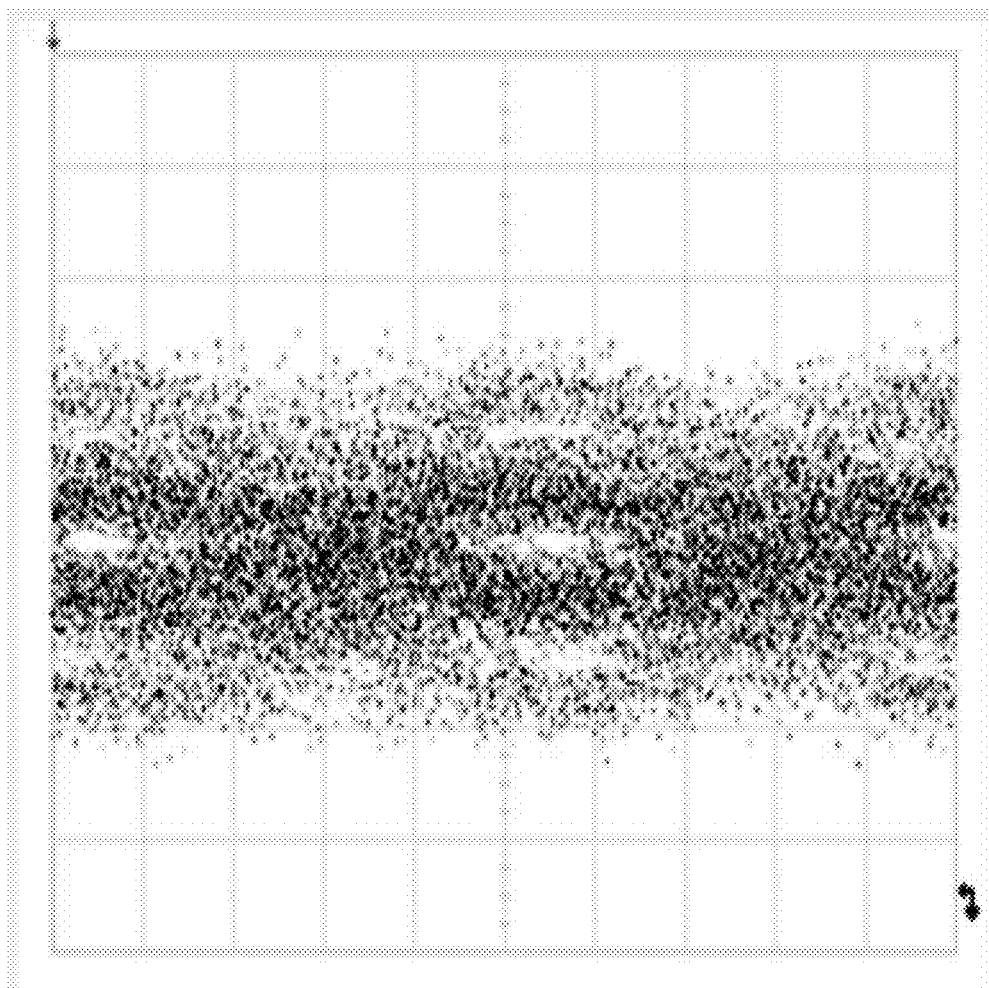
Fig. 30 Outer SDM channel output

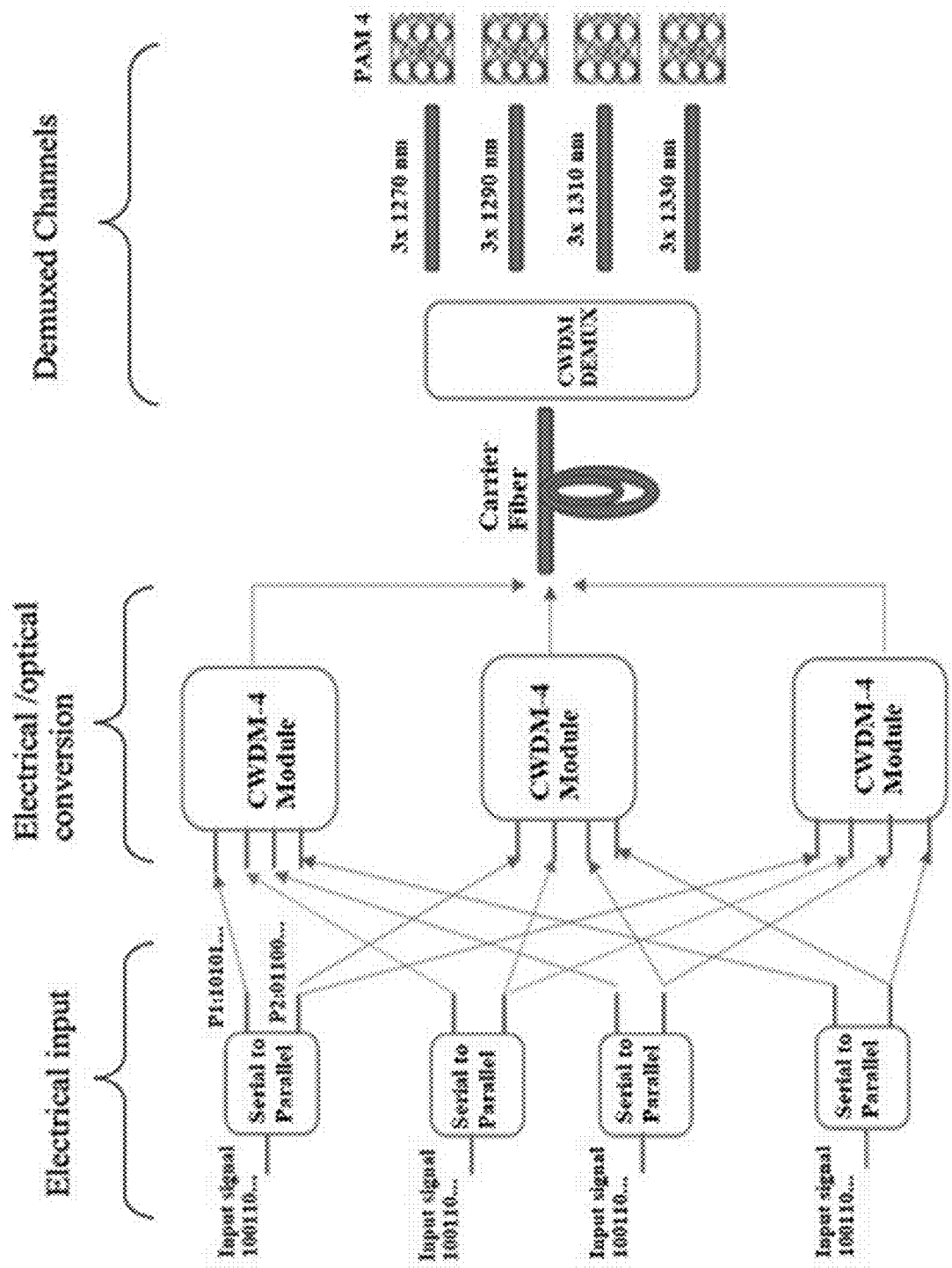
FIG. 31A Generating PAM-4 CWDM-4 Module

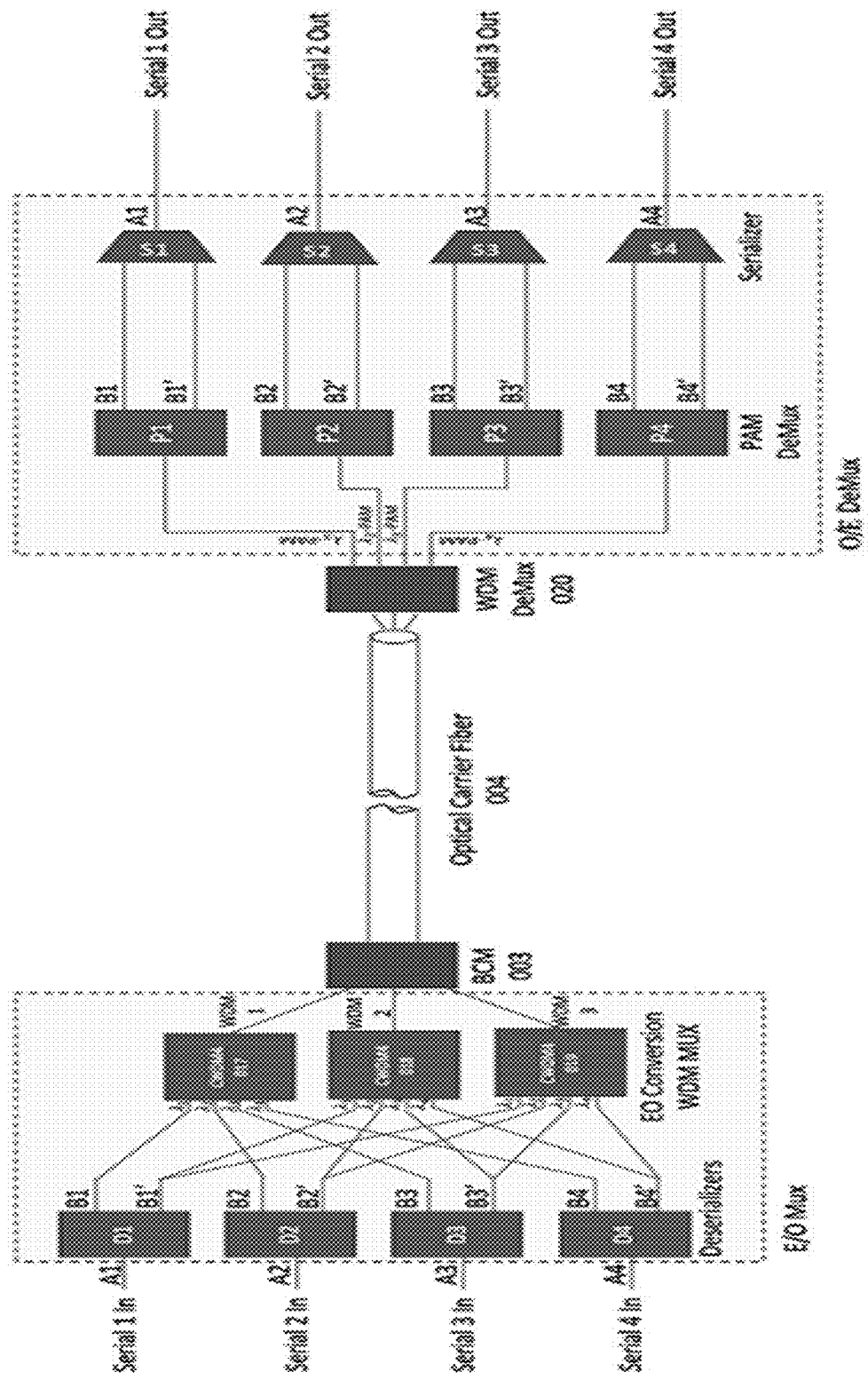
FIG 31B PAM-X/WDM SYSTEM

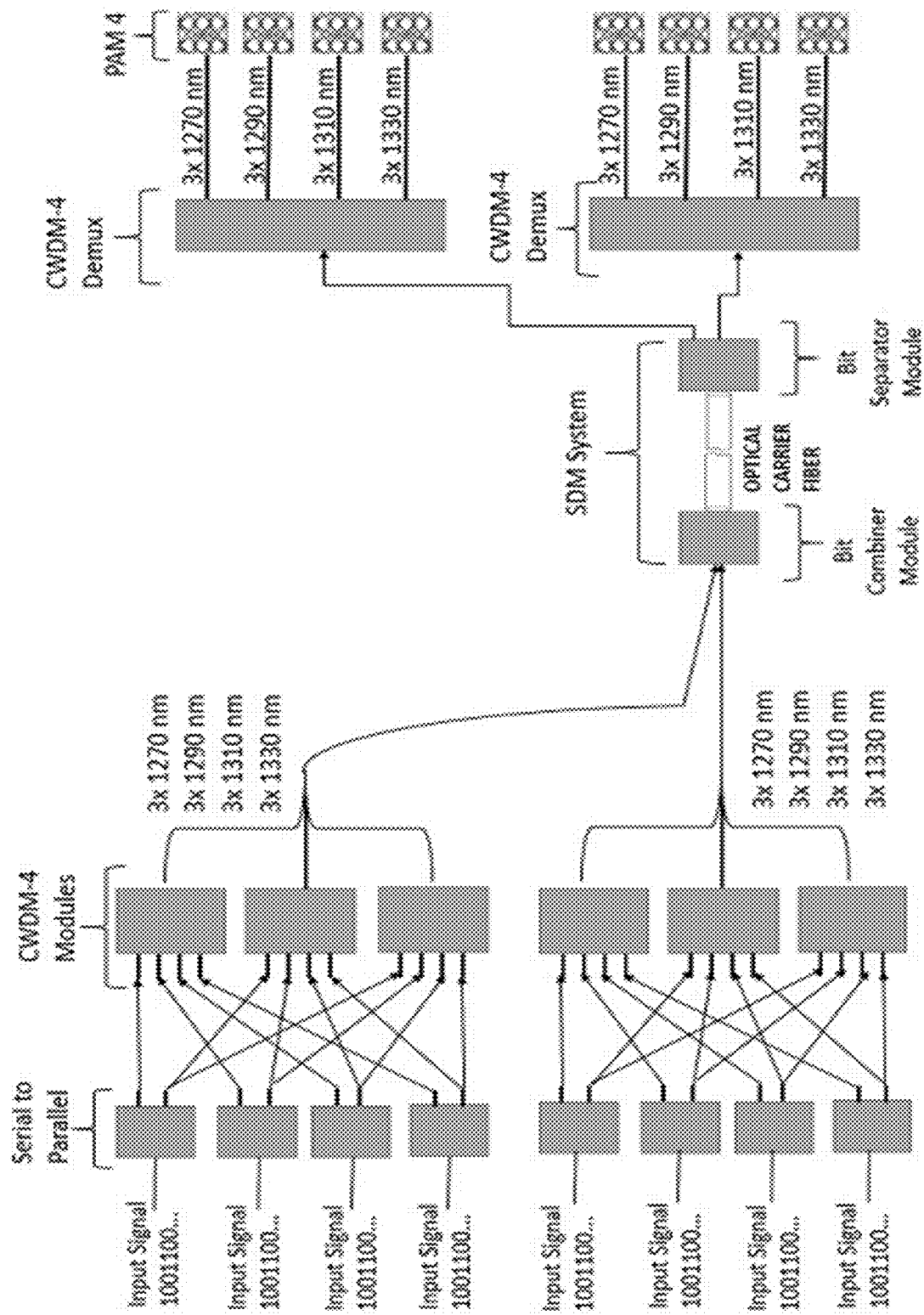
FIG. 32A PAM-X/WDM/SDM System

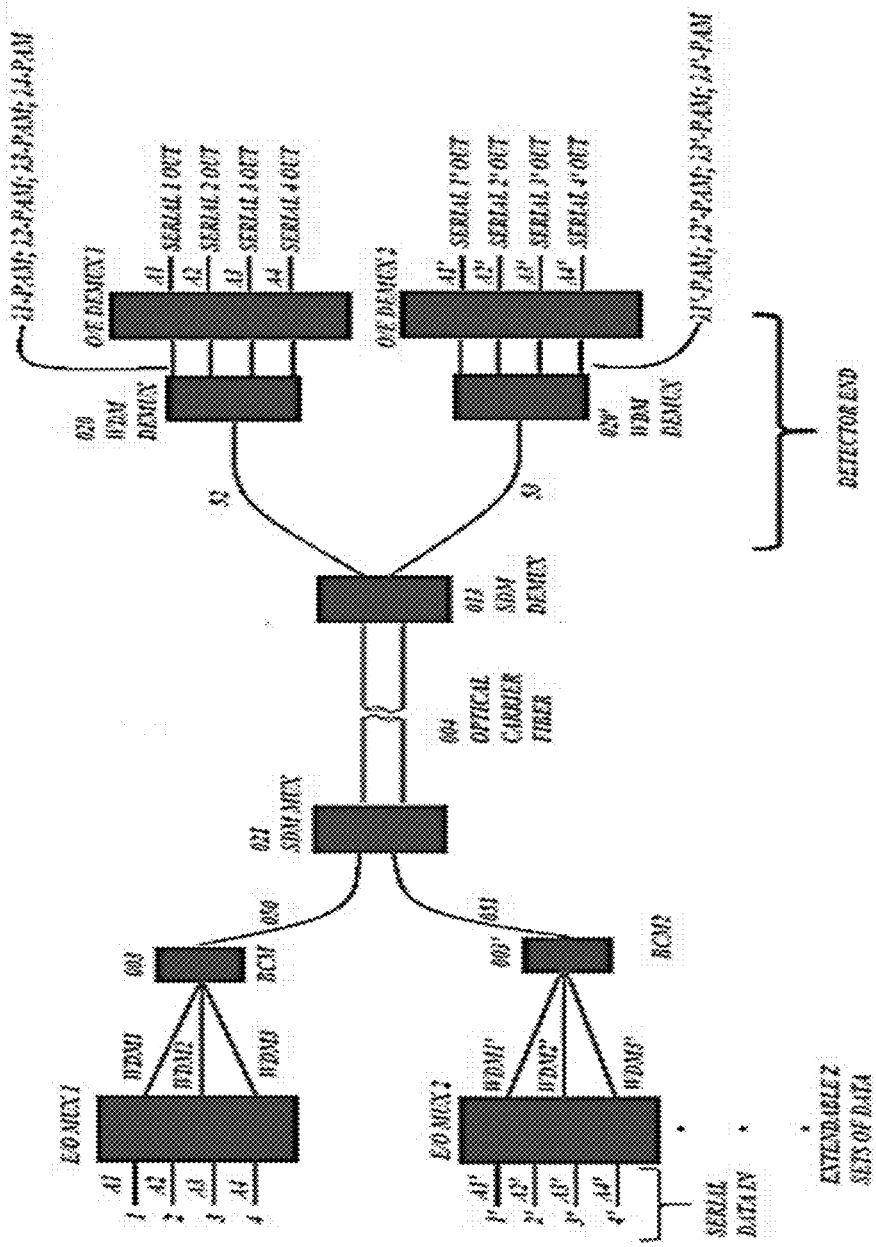
FIG 32B PAM-X/WDM/SDM SYSTEM

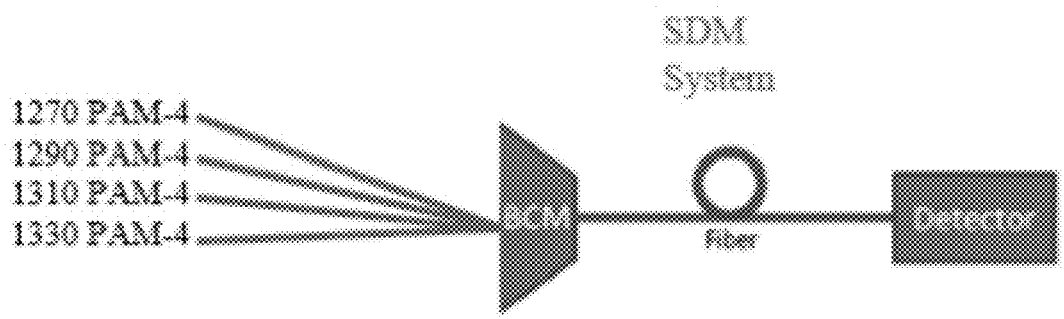
Fig. 33 Spatial domain multiplexing and PAM-4 with CWDM

1270nm

1290nm

1310nm

1330nm

Simulation results of PAM-4 modulated WDM channels

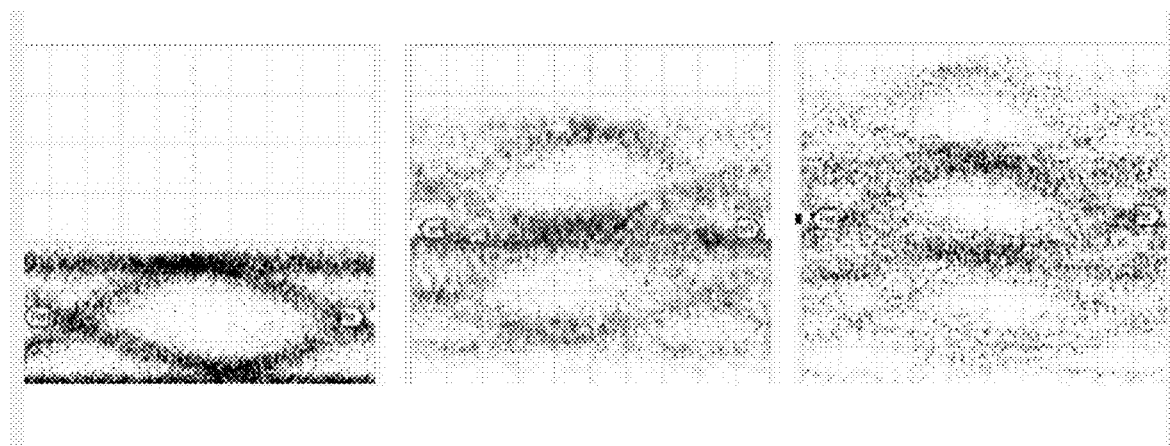
Fig. 35 Eye diagram of PAM-2, PAM-3 and PAM-4 with CWDM

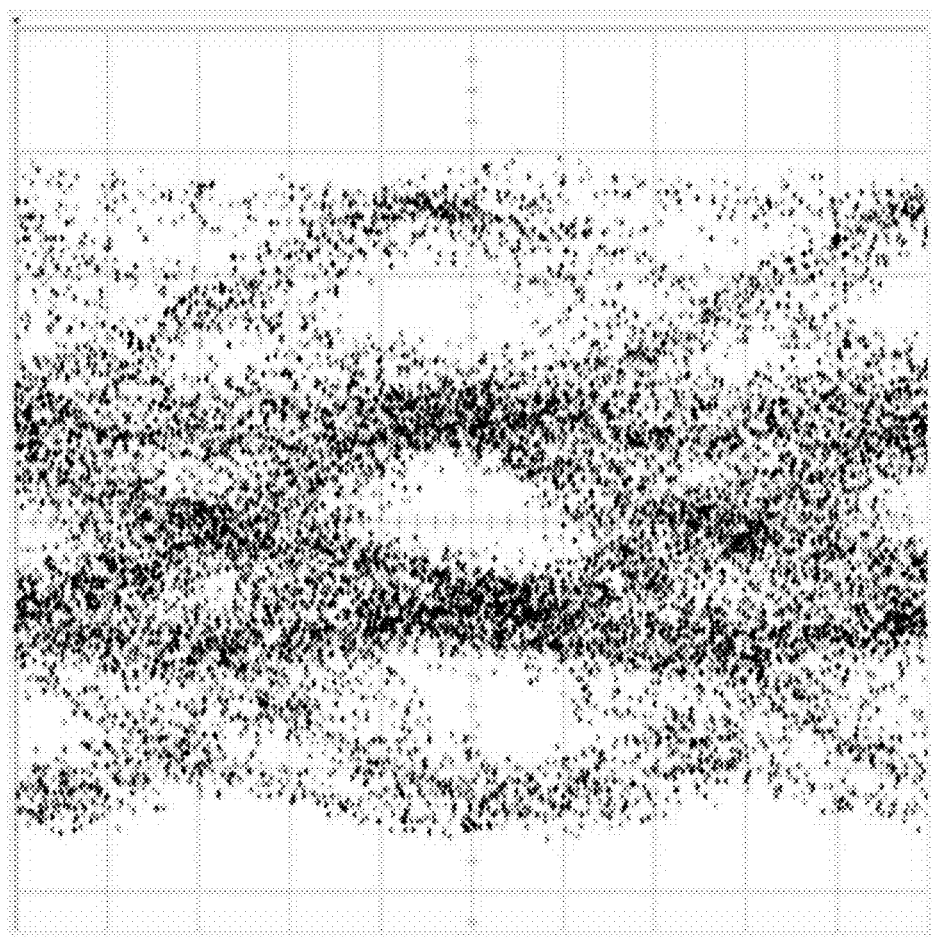
Fig. 36 Reference PAM-4 input signal 25 Gbaud CEDM Module

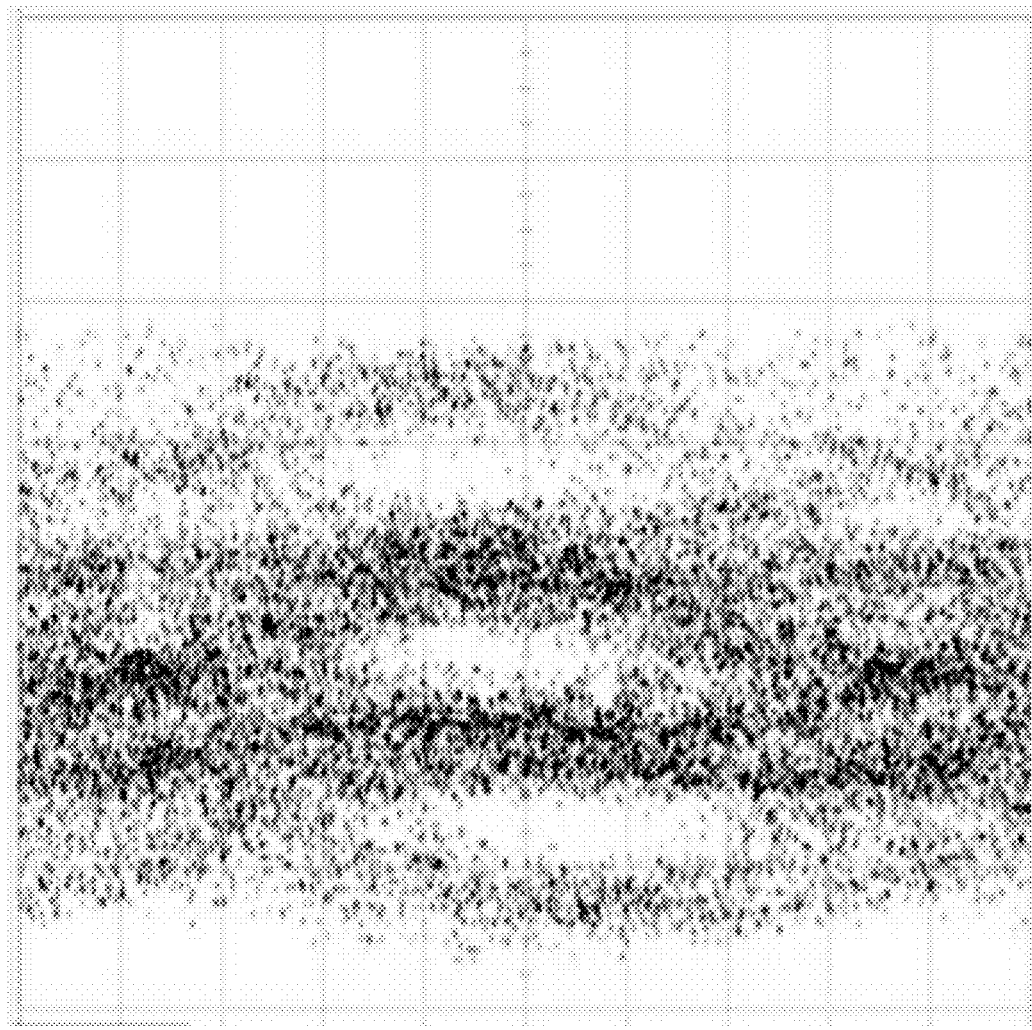
Fig. 37 SDM center channel output signal from 25 Gbaud CWDM Module

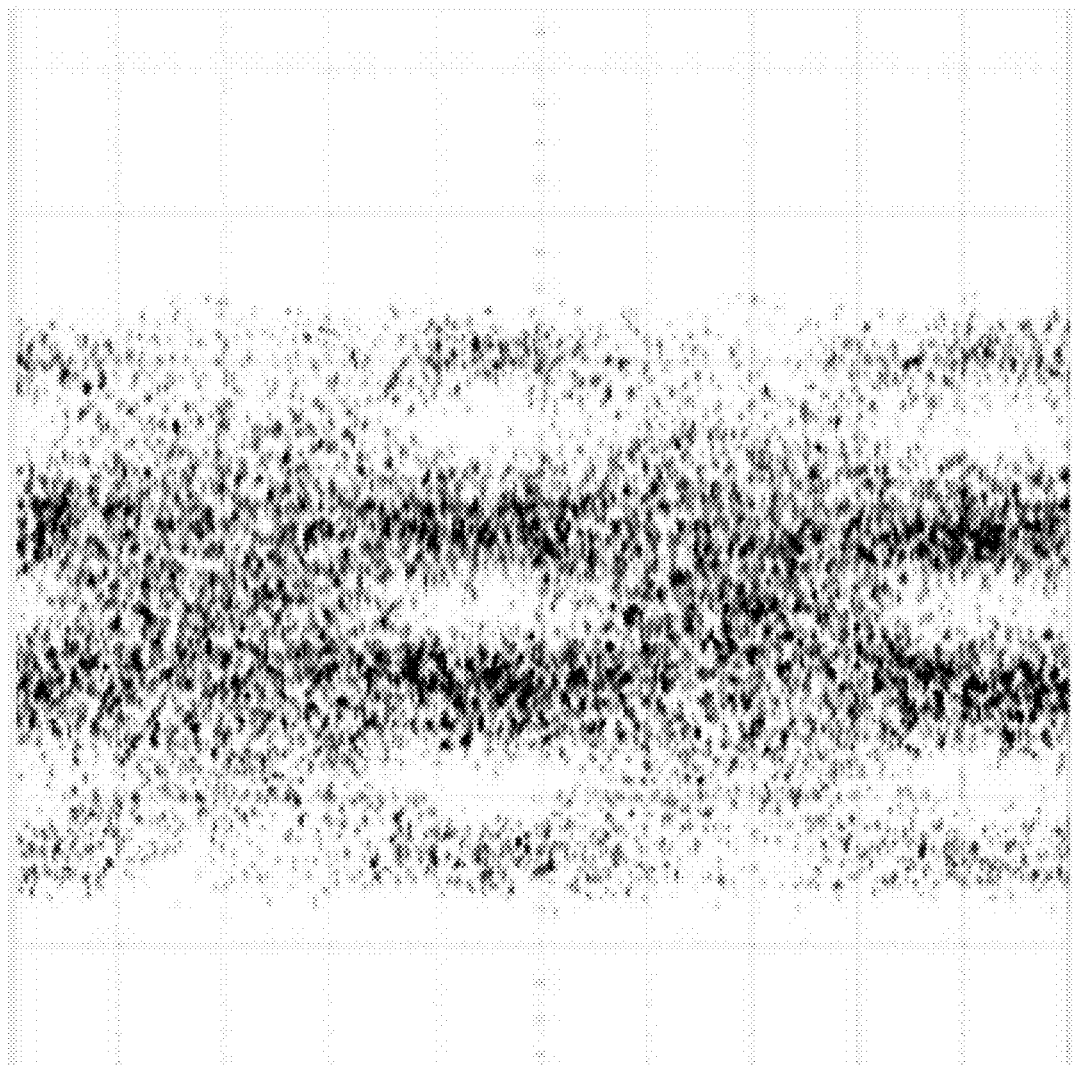
Fig. 38 SDM outer channel output signal from CWDM 4 Module

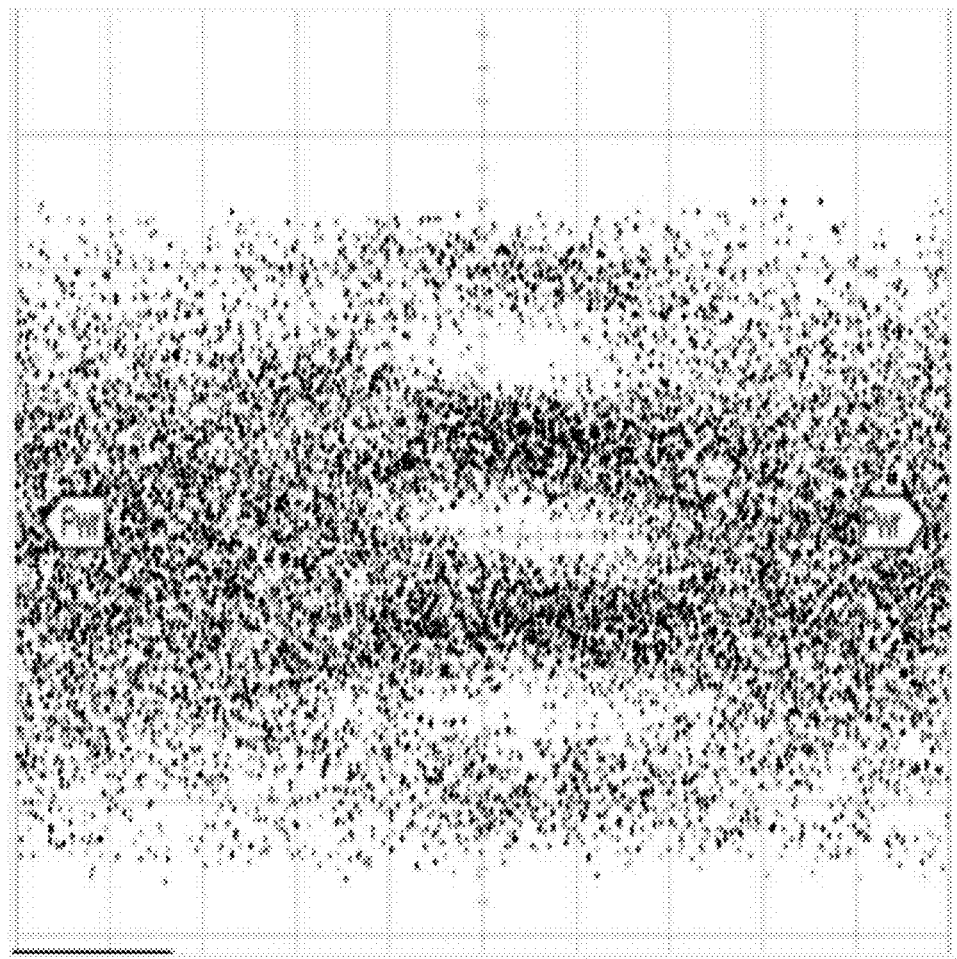
Fig. 39 PAM-4 structure from three different wavelengths taken from 25 Gbps QSFP28 CWDM4 Module

SYSTEM FOR ACHIEVING MULTIPLE BITS PER SYMBOL IN OPTICAL COMMUNICATIONS SYSTEMS BY COMBINING SPATIAL DOMAIN MULTIPLEXING AND PULSE AMPLITUDE MODULATION

CROSS REFERENCE TO RELATED APPLICATIONS AND INCORPORATION BY REFERENCE

This application is a divisional of U.S. non-provisional patent application Ser. No. 16/367,238 entitled SYSTEM FOR ACHIEVING MULTIPLE BITS PER SYMBOL IN OPTICAL COMMUNICATIONS SYSTEMS BY COMBINING SPATIAL DOMAIN MULTIPLEXING AND PULSE AMPLITUDE MODULATION, which was filed in the United States Patent and Trademark Office (USPTO) on Mar. 27, 2019 and which published from the USPTO as U.S. pre-grant publication no. US 2019-0356391 A1 on Nov. 21, 2019, which is hereby incorporated herein by reference in its entirety; Ser. No. 16/367,238 is a non-provisional of, and claims benefit of priority to, U.S. provisional patent application Ser. No. 62/648,486, filed in the United States Patent and Trademark Office (USPTO) on Mar. 27, 2018 titled SYSTEM FOR ACHIEVING MULTIPLE BITS PER SYMBOL IN OPTICAL COMMUNICATIONS BY COMBINING SPATIAL DOMAIN MULTIPLEXING AND PULSE AMPLITUDE MODULATION, which is hereby incorporated herein by reference in its entirety: this application also incorporates herein by reference in their entirety all the content and teachings of the following references, which are herein referred to as the "referenced patents": U.S. Pat. No. 9,529,147, titled ALL-OPTICAL SPATIAL DOMAIN MULTIPLEXING DE-MULTIPLEXER, which issued from the United States Patent and Trademark Office (USPTO) on Dec. 27, 2016; U.S. Pat. No. 7,639,909, titled METHOD AND APPARATUS FOR SPATIAL DOMAIN MULTIPLEXING IN OPTICAL FIBER COMMUNICATIONS, which issued from the United States Patent and Trademark Office (USPTO) on Dec. 29, 2009; U.S. Pat. No. 8,278,728, titled ARRAY OF CONCENTRIC CMOS PHOTODIODES FOR DETECTION AND DE-MULTIPLEXING OF SPATIALLY MODULATED OPTICAL CHANNELS, which issued from the United States Patent and Trademark Office (USPTO) on Oct. 2, 2012; and U.S. Pat. No. 8,396,371, titled ORBITAL ANGULAR MOMENTUM IN SPATIALLY MULTIPLEXED OPTICAL FIBER COMMUNICATIONS, which issued from the United States Patent and Trademark Office (USPTO) on Mar. 13, 2013.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

FIELD OF THE INVENTION

The field of the invention relates generally to systems and methods for providing wideband optical communications by achieving more than two bits per symbol per data stream, combined with simultaneous transmission of multiple data streams. An exemplary, non-limiting example is the use of Pulse Amplitude Modulation (PAM), for example PAM-4, to achieve four bits per symbol in plurality of optical data streams by employing PAM-4 in each stream, and combining the plurality of optical data streams in simultaneous transmission along a single optical fiber using Spatial Domain Multiplexing (SDM) or Wavelength Division Multiplexing (WDM).

BRIEF SUMMARY OF THE INVENTION

The present invention comprises an apparatus and method that have one or more of the following features and/or steps, which alone or in any combination may comprise patentable subject matter.

The present invention implements a novel form of PAM applied to SDM to achieve multiple bits per symbol transmission. In an embodiment, the invention comprises a system and a method for receiving an input serial binary data stream; converting said input serial binary data stream to n independent parallel data streams of quantity X-1; transmitting the n independent parallel data streams simultaneously along an optical fiber using SDM; receiving the n independent parallel data streams from an output port of said optical fiber; converting said received n independent parallel data streams into a single recovered serial binary digital data stream, wherein the number of bits per symbol in each independent parallel data stream is X.

In various embodiments of the invention, PAM and SDM may be combined in several ways. (SDM) channels can be combined in a fashion that their intensities add together to generate pulse amplitude modulation, thereby enabling transmission of multiple bits per symbol. In an embodiment, all SDM channels fall over a single photodetector to produce PAM. In a further embodiment, each SDM channel is PAM encoded independently of the other SDM channels. The invention may be adapted to comprise and guide individual laser sources into the fiber to create a 4 level PAM system to be used as an input for SDM systems.

In a typical binary system of the prior art, Non-Return to Zero (NRZ) modulation scheme is sometimes used for optical communication. However, for example, PAM-4 uses two bits/symbol whereas, NRZ uses one bit per symbol. As a result, the data rate of a PAM-4 system is doubled over the data rate of an NRZ within the same baud rate. Currently the optical communications industry is moving towards, for example, 50 Gbaud PAM-4 level signaling. Dedicated PAM-4 IC chips are required to achieve PAM-4 modulation. However, these PAM-4 generating ICs are usually very expensive, and they consume a significant amount of electrical power. Hence, the current invention provides significant advantage over the prior art in that for example, in a PAM-4 system, it comprises three laser sources using an NRZ/RZ modulation scheme, thus eliminating the currently available expensive and power-hungry PAM-4 generating ICs. In the non-limiting PAM-4 example, the invention uses the combined intensities of three laser sources, adding them incoherently to create four different optical intensities and resultant voltage levels at the SDM detector, providing a PAM-4 scheme. The intensities of the independent laser sources may be similar or different, but are preferably similar. Similarly three or more than three laser sources could be combined in the desired fashion to achieve desired intensity and resultant voltage levels at the detector end. The invention may comprise any number of laser sources incoherently combined to achieve a desired range of intensities and resulting detected voltages at the detector end, such voltages corresponding to PAM signal levels.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings:

FIGS. 1-4 depict mode diagrams of various typical optical waveguide systems.

FIGS. 5A and 5B depict perspective views of single-core multi-mode and single-mode fiber, respectively.

FIGS. 6A, 6B and 6C depict perspective views of different types of multi-core fibers.

FIG. 7 depicts E-field power density in a fiber, in a transverse direction to the longitudinal axis of the fiber.

FIG. 8 depicts an exemplary SDM output ring profile.

FIG. 9 depicts an exemplary SDM system configuration.

FIG. 10 depicts different combinations of SDM output rings.

FIG. 11 depicts the SDM input single mode fibers for launching into an SDM optical carrier fiber.

FIG. 12 depicts a 3-D printed multiplexer for launching from input fibers into an SDM optical carrier fiber.

FIG. 13 depicts a lens configuration for de-multiplexing an SDM output.

FIG. 14 depicts a concentric CMOS detector for detecting output SDM rings.

FIG. 15 depicts a hollow core fiber.

FIG. 16 depicts a multi-prism SDM de-multiplexer of an embodiment of the invention.

FIG. 17 depicts an exemplary OOK waveform of an embodiment of the invention.

FIG. 18 depicts PAM-2, PAM-4 and PAM-8 level of embodiments of the invention.

FIG. 19 depicts SDM channel power for various SMD channels and their combinations.

FIG. 20 depicts an embodiment of a PAM-4 system, showing the corresponding output SDM rings and binary symbol correlation in an embodiment of the invention.

FIGS. 21A-21B depict an exemplary PAM-4 system block diagram of embodiments of the invention.

FIG. 21C depicts an exemplary PAM-4/SDM system block diagram of embodiments of the invention.

FIG. 22 depicts an exemplary PAM-4 parallel data stream to serial data stream bit mapping, showing corresponding SDM channel ON-OFF states in an embodiment of the invention.

FIGS. 23A-23C depict PAM-2, PAM-3 and PAM-4 measured eye diagrams, respectively.

FIGS. 24-26 depict PAM-4 simulated eye diagrams for 850 nm, 1310 nm and 1510 nm, respectively.

FIG. 27 depicts a reference PAM-4 input signal eye diagram.

FIG. 28 depicts the launching of optical energy from two input fibers into an SDM carrier fiber in an embodiment of the invention.

FIG. 29 depicts a measured recovered eye diagram of center channel SDM output produced by an embodiment of the invention.

FIG. 30 depicts a measured recovered eye diagram of an outer channel SDM output produced by an embodiment of the invention.

FIGS. 31A and 31B depict an embodiment of a PAM-4/WDM system of the invention.

FIGS. 32A and 32B depict an embodiment of a PAM-4/WDM/SDM system of the invention.

FIG. 33 depicts generation of SDM channels out of PAM-4 modulated WDM channels in an embodiment of the invention.

FIG. 35 depicts PAM-2, PAM-3 and PAM-4 measured eye diagrams produced by an embodiment of the invention.

FIG. 36 depicts a reference PAM-4 input signal eye diagram with WDM channels produced by an embodiment of the invention.

FIG. 37 depicts the SDM center channel output eye diagram with PAM-4 modulated WDM channels produced by an embodiment of the invention.

FIG. 38 depicts the outer channel output eye diagram with PAM-4 modulated WDM channels produced by an embodiment of the invention.

FIG. 39 depicts PAM-4 structure from three different wavelength taken from QSFP28 CWDM module produced by an embodiment of the invention.

DETAILED DESCRIPTION OF THE INVENTION

Figure 34A:
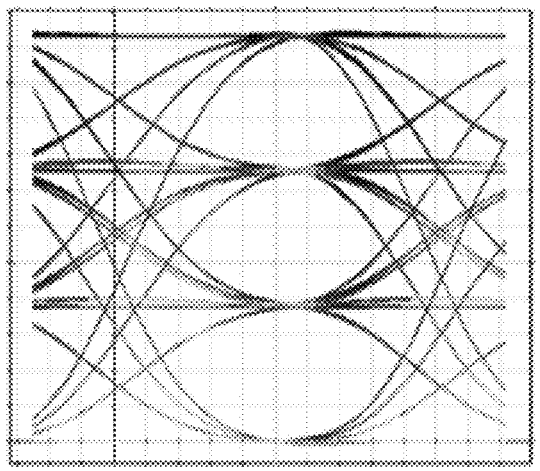
FIGS. 34A-34D depict PAM-4 simulated eye diagrams of each WDM channels (1270 nm, 1290 nm, 1310 nm, and 1330 nm respectively) produced by an embodiment of the invention.

The following documentation provides a detailed description of the invention.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus, the scope of the invention should be determined by the appended claims and their legal equivalents, and not merely by the preferred examples or embodiments given.

Spatial domain multiplexing (SDM) is an efficient multiplexing technique which allows multiple co-propagating optical channels by allocating individual input to a unique spatial location. Some of the many methodologies to accomplish this are: separate spatial modes, separate cores, and helical mode separation. All of the teachings of the referenced patents regarding SDM are herein incorporated by reference.

The separate spatial modes SDM methodology separates each channel by manipulating the electric-field patterns into separable and non-interfering modes. This process is also often known as mode division multiplexing (MDM). The most common field patterns utilized are either Linearly Polarized (LP) modes, Hermite-Gaussian (HG) modes or Laguerre Gaussian (LG) modes. FIGS. 1 and 2 show depictions of each mode pattern and their possible states. While they are all similar, LP modes are excited inside optical fibers or other similar media while LG modes are predominately free space modes. In both systems, each input channel may be excited through the use of lenses, diffraction gratings, or other state of the art technologies to produce specific LG, HG or LP modes and transferred to the desired location.

The key to SDM methodology is to excite separable spatial modes, or modes that will not overlap, and thus attribute no cross talk or errors to adjacent channels. For example, LG modes LG00 and LG12 may be excited as seen in FIG. 3. These two modes will propagate without interference as they are not contained in the same spatial location. A similar idea can be performed on LP modes; however, these are more unique compared to LG modes as LP modes have specific polarization states. As seen in FIG. 4, LP11 can occupy two distinct states, typically referred to as LP11x and LP11y. These two states may be overlaid on each other to create a similar situation to FIG. 3 where there are two distinctive co-propagating channels.

Applications of MDM have shown considerable gains with higher data rates in the high Tb/s range, especially when combined with other techniques; however, physical media currently limits the practicality of its implementation. It is difficult to maintain each of the specific mode's states as factors such as dispersion, bending and the natural birefringence of fibers cause the modes to shift to adjacent modes as the signal travels. These factors can be mitigated through the use of special fibers, in the LP mode case, but they cannot currently be removed entirely; as such, there's a practical limit to both distance and number of modes that can be utilized in SDM communication systems.

The multi-core SDM methodology utilizes a unique fiber optic design comprised of a plurality of core regions inside a single fiber. As shown in FIGS. 5A and 5B, a standard optical fiber consists of a single core region surrounded by a lower refractive indexed cladding material. In this new design, multiple circular core regions are interlaced inside together inside one cladded core region. This is typically referred to as multi-core fiber. Examples of 2-, 4-, and 7-core fibers can be seen in FIGS. 6A, 6B and 6C, respectively. The purpose of the multi-core design is to physically separate each channel into its own propagating path a long a dedicated core. As each core acts as its own internally reflective region, they are theoretically capable of propagating modes in the same manner as a standard optical fiber. As such, the more cores are disposed inside the standard cladding, the more propagating channels may be achieved and supported. Data is typically coupled into the individual fiber cores through the use of a photonic lantern design.

The multi-core approach be compared to placing multiple standard optical fibers. The multi-core design also has a physical limitation as the number of cores are limited by the physical cladding area. Further, one drawback of the multi-core approach is that the close proximity of the cores will likely lead to increased cross talk between cores. As shown in FIG. 7, when waves propagate inside optical fibers, a very small portion of the wave leaks into the cladding; as such, the cores need to be sufficiently separated to prevent this cross talk from occurring. Despite these challenges, there has been significant research and interest in this design.

A still further SDM technology, called helix SDM, utilizes a technique similar to what is seen in the first methodology. By launching the input communication signal at some non-zero angle into a carrier fiber, the channel propagates in an atypical fashion and at the carrier fiber's end, it appears as a doughnut shaped ring whose radius is proportional to the input angle. If multiple input channels are launched at varying angles, each channel propagates helically and independently from one another and the collective channels appear as a plurality of concentric rings, as seen in FIG. 8. FIG. 9 depicts the architecture of a standard SDM system.

The increased launching angle causes the propagating channels to propagate via skew ray methodology. This 'corkscrew' pattern is theorized to cause the optical channel to induce an optical vortex like effect which is a phenomenon where a propagating channel has a null region in its center, and was originally described as a "dislocation in a wave train," which is a diffraction or phased base cancellation; however, a phase cancellation implies that the electric field patterns inside the fiber are interfering with one another. As shown in FIG. 10, each SDM ring channel is independent from one another. The rings can be turned on and off without affecting adjacent channels. As a phase based solution implies superposition of the fields, this would imply that the SDM channels will interfere with one another, which is clearly not the case. As such, further research is needed to identify the cause of the SDM rings.

One avenue of research links this style of SDM to MDM based SDM. MDM's base system is exciting specific modes that will propagate without interference with co-propagating channels. As discussed earlier, one of the primary field patterns utilized is the Laguerre-Gaussian wave equation, as shown in Equation 1 below.

$$LG_{pl}(r, \Phi, z) = \frac{1}{w(z)} \sqrt{\frac{2pl}{\pi(p+|l|!)}} * \left(\frac{\sqrt{2}\,r}{w(z)}\right)^l L_p^l\left(\frac{2r^2}{w(z)^2}\right) \exp\left(-\frac{r^2}{w(z)^2}\right) * \exp\left[-jk\frac{r^2}{2R(z)}\right] \exp[-j\psi(z)] * \exp(jl|\Phi) * \exp[-jkz] \quad (1)$$

Where,
r=The radial distance from the beam axis
w(z)=Beam radius at distance z
Φ=the azimuthal position
k=wave number
$Z_R$=Rayleigh range
z=The distance from beam axis
R(z)=Radius of curvature at wavefront
$L_{pl}$=Associated Laguerre polynomial
l=Topological charge
p=Radial indices
ψ=Gouy Phase shift
Where, $$w(z)^2 = w_0^2\left[1 + \left(\frac{\lambda z}{n\pi w_0^2}\right)^2\right]$$

$$w_0 = \frac{\lambda z}{\pi w(z)}$$

$$z_R = \frac{\pi w_0^2}{\lambda}$$

$$R(z) = z\left[1 + \left(\frac{z_R}{z}\right)^2\right]$$

$$\psi(z) = (2p + |l| + 1)\tan^{-1}\left(\frac{z}{z_R}\right)$$

As seen in FIG. 3, increasing the radial index increases the number of propagating rings; whereas increasing the azimuthal index increases the overall radius of the propagating rings. It has been shown that by zeroing the radial index and only increasing azimuthal index, one can obtain ring patterns similar to what is seen in the helix based SDM model. The resulting equation can be seen in Equation 2 below.

$$LG_0^l(r, \Phi, z) = \frac{1}{w(z)} \sqrt{\frac{2}{\pi(|l|!)}} * \left(\frac{\sqrt{2}\,r}{w(z)}\right)^l \exp\left(-\frac{r^2}{w(z)^2}\right) * \quad (2)$$

-continued $$\exp\left[-jk\frac{r^2}{2R(z)}\right]*\exp[-j\psi(z)]*\exp(jl/\Phi)*\exp[-jkz]$$

Thus, helix based SDM behaves very similarly to MDM; however, two key differences emerge. First, as there is only a single ring, a much larger number of SDM rings may be launched compared to the MDM limit. Second, helix SDM is not affected by the natural birefringence present in optical fibers. There has been no evidence of helix SDM channels converting to adjacent modes as occurs in LP modes in MDM systems. This implies that helix SDM systems are more robust than MDM based systems and may be more compatible with alternative optical systems. Helix-based SDM systems can be achieved simply by launching several single mode fibers directly into a carrier fiber, as seen in FIG. 11; however, this requires very precise aiming and is prone to vibrational errors. It also lacks portability. One solution was created using a 3-D printed multiplexing unit, as seen in FIG. 12, which allows the carrier and input fibers to be inserted and aimed using preset angles. This offers more portability than manually aiming the system and is less subject to aiming and vibrational losses.

If the carrier fiber is taken directly to a standard PIN diode, each ring's optical power will be read as one channel, and the benefit of the helix based SDM will be lost. In order to utilize SDM to its fullest, it requires special de-multiplexing techniques. The simplest SDM system in design is using a system of arrayed lenses and photodetectors to detect the separate SDM channels. One example of this design can be seen in FIG. 13. A similar system using a 3 dB splitter and lenses was created. As with the manual SDM multiplexer, the lens based de-multiplexer design requires very precise alignment and is heavily subject to vibrational losses. While it requires fairly few and easy to acquire components, this makes it highly impractical for both standard and mobile deployments. This means a more modular approach or a special detector is needed. One such detector is created using a concentric CMOS photodetector array, as seen in FIG. 14. Its simulated and experimental results showed a great deal of promise; however, as it is a special detector, it requires a redesign of currently deployed communication systems which is a lengthy and expensive process. As such, a de-mux that conforms to current systems is sought.

One such de-multiplexer utilizes an optical-to-optical process by physically separating the SDM channels and guiding each into a separate single mode fiber which is then taken to a standard photodiode for processing. This is accomplished by creating an array of concentric hollow-core optical fibers and tapering the output end. This can be seen in FIG. 15. This architecture can be directly mated to the carrier fiber and does not require changing of current communication systems. Alternative inline solutions, as seen in FIG. 16, are within the scope of the claimed invention.

It has been shown that SDM is compatible with multiple current communication technologies. Of particular note is wavelength division multiplexing (WDM), as experimental testing has shown that the SDM ring locations are not dependent on wavelength. With this particular nature in mind, various systems and techniques were analyzed for their compatibility with SDM systems. This leads to the application of pulse amplitude modulation (PAM).

PAM is a multilevel modulation technique which encodes data onto a carrier signal by modulating its amplitude. The most common form of this type of modulation technique is the very basic on-off keying (OOK) that commonly employed for today's optical communication systems. In OOK, the amplitude level 1 is assigned a bit value of 1 and the amplitude level 0 is assigned a bit value of 0, so basically if a bit is high, the carrier sine wave is present; otherwise, a low bit would represent no signal present. An example binary sequence is shown in FIG. 17. OOK is very simple to implement, as one can just turn on and off the signal source to achieve modulation; however, it does have a limit. OOK is heavily dependent on system rise time. As speeds are increased, there is a point where the capacitance inherent in some system components limits how quickly the system can be turned on or off. This is often the limitation of higher speed systems. As this is the case, OOK needs to be expanded.

As mentioned earlier, OOK is a special case of PAM also known as PAM-2. In short, each sampled point in an OOK signal carries 1 bit; in other words, OOK has an efficiency of one bit per symbol. If one wishes to improve upon this system, a more efficient scheme needs to be created. In a PAM system, this is accomplished by increasing the possible number of amplitude levels per signal. For example, by increasing the number of levels from two to four, each symbol now carries two bits of information, effectively doubling the bit rate of said signal. This can be compounded further to increase the overall efficiency of the system. Equation 3 dictates the total number of levels each bit requires.

$$\text{\# of amplitude levels} = A_N = 2^N$$

where N is the number of bits and $A_N$ is the total number of amplitude levels required. For example, a three-bit system will result in an 8 level system, or PAM-8; a four bit system will result in PAM-16, etc. Example diagrams for PAM-2, PAM-4, and PAM-8 systems can be seen in FIG. 18. As a result of this efficiency increase, the data rate of the overall communication system increases. Other PAM generating methods are sought after to overcome these issues.

PAM and PAM-SDM

It is immediately clear that these additional PAM levels can be applied to the helix based SDM model because a propagating channel's ring location is not a function of its power level; however, this still requires proper de-multiplexing, and not only does this not overcome this problem, it actually compounds the issue by further requiring a more precise scheme to properly distinguish the amplitude level of the data present. As such, it is required that PAM be applied to SDM in a more unique fashion.

The crux of SDM de-multiplexer difficulties is that typically employed photodiodes have difficulty distinguishing between the individual SDM channels. If multiple rings fall incident on a single photodetector, the photodetector adds the total power and reads it as a single source, as shown in FIG. 19; however, this limitation of photodetectors can be utilized to apply PAM to an SDM channel. When two nearly or completely coherent electromagnetic waves traverse the same location their total power is a function of the phase differences between the two waves, often called wave interference. This means that two nearly identical sources being launched into the same fiber will not necessarily add their total powers together. Despite this fact, it can be seen in FIG. 19 that SDM channels do add their powers if one looks at the entire channel. This is because SDM rings occupy different spatial locations, and as such, are not subject to the same wave interference that typical Multiple Input-Multiple Output (MIMO) systems will experience.

PAM systems typically modulate a single source to achieve its power levels either through phase interferometers, such as Mach-Zehnder interferometer in optics, or by directly modulating the source current; however, using the unique power properties of an SDM carrier channel, similar results can be achieved by using multiple lasers as in the present invention. For example, if one were to launch two lasers of amplitude A using helix based SDM, there are three different possible amplitude levels at the system output: 0, 1, or 2 A, depending on which channels are on or off at the point of measurement. This means by turning on or off particular SDM channels, the optical channel power can be directly PAM modulated.

In an embodiment of the invention, incoherent addition of laser sources will yield PAM-X signals. Hence the addition of appropriate laser sources can be used to generate the PAM-X signals of the invention. These signals may use SDM techniques or may be independent of SDM techniques of claim 1. Hence it is possible to use multiple laser sources to generate a single channel PAM-X signal of the invention.

In order to achieve a PAM-X level system, X-1 rings, or channels, of equivalent power are necessary. These rings could be achieved in a number of ways, either individual lasers or a lower number of lasers with splitters and electro-optic crystals for modulation of individual channels. There is a practical limitation using this methodology as one cannot realistically apply a larger and larger number of channels as there are both a signal-to-noise ratio and a footprint requirement for conventional systems. For every extra bit per symbol that is added to this system, the number of required channels rises exponentially. Thus, PAM-4 requires two extra rings for the increased bit; PAM-8 requires four extra channels over PAM-4; etc.

The application of PAM to an SDM system, as described and claimed herein, may be accomplished, in an embodiment, by turning on an increasing number of rings corresponding to each amplitude level in the case in which helical SDM is used. For example, if it was desired to send a '01' in a PAM-4 system dictated by FIG. 18, one would turn on the innermost channel. If a '11' were required, the two innermost channels would turn on. The full list of possible PAM-4 states for this setup can be seen in FIG. 20. This relationship would hold true for an increasing number of helical SDM channels related to a PAM-X system.

In the above system, receiving a 2 A signal would be ambiguous as any two channels could be on to achieve this. For example, in the PAM-4 system, 2 A could be achieved using channels 1 and 2, 2 and 3, or 1 and 3. Any one of these states will work, and the detector has no capability of determining which state is occurring. A more rigorous methodology would be to assign each bit a specific set of lasers. In an exemplary the PAM-4 system of the invention, the least significant bit may be attributed to a single channel, channel 1. The most significant bit may be attributed to two channels, 2 and 3. Using this setup, not only is the ambiguity removed, but the circuitry necessary to achieve it is fairly simple, shown in FIGS. 21A-21C. An example of the bit mapping of the entire process of this embodiment of the invention is illustrated in FIG. 22.

Referring specifically to FIGS. 21A and 21B, a basic layout of an exemplary embodiment of the invention is depicted in which a single serial input 001 is deserialized, converted to a plurality of optical SDM channels that propagate along an optical carrier fiber 004, detected as a PAM-X signal at the detector end of the system, converted from electrical PAM-X to a parallel bit stream, and then serialized, resulting in a recovered serial bit stream 008 that is a replica of input serial bit stream 001. Serial data 001 is provided as an input A to a Serial to Parallel convertor 002, which converts serial data 001 to two-bit wide output consisting of least significant bit B and most significant bit B'. In this exemplary embodiment, least significant bit B is provided as input to laser 1, L1, and most significant bit B' is provided as input to lasers 2 and 3, L2 and L3. The optical outputs of L1 and L2/L3 are coupled to optical carrier fiber 004 through an SDM multiplexer 003, which is selected to properly couple the optical outputs of L1 and L2/L3 to optical carrier fiber 004 such that L1 and L2/L3 each propagate along optical carrier fiber 004 in separate SDM channels. Thus, the structure of SDM multiplexer 003 BCM may take the form of beam optics, optical fiber fixturing, other structures appropriate to couple the optical outputs of L1 and L2/L3 to optical carrier fiber 004 such that L1 and L2/L3 optical signals are optically coupled into optical carrier fiber 004 creating separate MDM, helical, or multi-core SDM channels in optical carrier fiber 004 representing each deserialized bit stream B and B" (and, in other embodiments, B''' and so on). Thus, there may be one or more optical SDM channels C propagating along optical carrier fiber 004. Optical carrier fiber 004 is optically coupled to optical detector 005 at the detector end of the system. At the detector end of optical carrier fiber 004, the separate SDM channels optically exit the fiber D where they are detected by optical detector 005, resulting in an electrical PAM signal E that is input to PAM Demux 006. PAM Demux 006 converts electrical PAM signal E into two recovered bits streams at F, which are recovered least significant bit B and most significant bit B'. Least significant bit B and most significant bit B' are then input to serializer 007 to produce the recovered serial bit stream G, which is a recovered version of input serial data 001, and presented as serial data output 008. It is to be understood that the exemplary system of the invention depicted in FIGS. 21A and 21B is an example only, and that the system of the invention may comprise any number of channels of deserialized data B, B', B" and so on, supporting any bit mapping desired. Thus, the bit mapping of FIG. 22, which corresponds to the n=2/PAM-4 system depicted in FIGS. 21A and 21B is an exemplary embodiment of the system of the invention.

Still referring to FIGS. 21A and 21B, a multi-level PAM-X communication system is depicted where X is the number of PAM levels, comprising a serial to parallel convertor comprising an input port for receiving an input serial data stream of binary data, said serial to parallel convertor converting said serial stream of binary data into n parallel binary serial data streams, numbered sequentially in order from Least Significant Bit (LSB) to Most Significant Bit (MSB) such that the Least Significant Bit is numbered 1 and the Most Significant Bit is numbered n; a plurality of x optical sources for converting serial binary electrical data to binary serial optical data, each of said optical sources producing an optical signal output; and wherein:

$$x = \sum_{i=1}^{n} 2^{i-1}$$

wherein said n parallel binary serial data streams are each in communication with w of said x optical sources according to the relation, beginning from Least Significant Bit to Most Significant Bit:

$$w = \sum_{i=0}^{n-1} 2^i$$

Thus an n=2 system utilizes three optical sources (i.e, x=3), with the LSB in communication with one optical source, and the MSB in communication with two optical sources. An n=3 (PAM-8) system utilizes seven optical sources (i.e, x=7), with the LSB in communication with one optical source, the next sequential bit in communication with two optical sources, and the MSB in communication with four optical sources. And so on.

Each of said optical sources is optically coupled to an input end of an optical carrier fiber 004, where each of said optical source output signals is incoherently combined into a combined PAM-X optical signal of X bits per symbol when the optical source output signals are coupled into optical carrier fiber 004, the optical carrier fiber supporting propagation of the combined optical signal to an output end; wherein each of the optical sources may be placed in an OFF state or an ON state corresponding to a zero or one binary character of the parallel binary serial data stream that is input to the optical source. The optical carrier fiber 004 is in optical communication with an optical detector 005, the optical detector converting the combined optical signal to a corresponding electrical signal characterized as a PAM-X signal of X bits per symbol. Optical detector 005 is in communication with a PAM-X de-multiplexer 006 converting said PAM-X signal of X bits per symbol to n parallel binary serial data streams; and PAM-X de-multiplexer is in communication with a serializer, said serializer converting said n parallel binary serial data streams to a single serial data stream that is a replica of the serial input data stream.

Referring now to FIG. 21C, a further embodiment of the invention is depicted in which the PAM process is applied to individual SDM channels. In this embodiment, a plurality of input serial data streams 001, 001', and so on are input to deserializers that convert each input serial data streams to a two-bit wide parallel output indicated by signals B1 and B1', which are deserialized data streams from input serial data stream 001; signals B2 and B2' which are deserialized data streams from input serial data stream 002; and so on, up to y input serial data streams. Y may be any number, limited only by the ability of the SDM system to support a plurality of independent SDM channels. In this embodiment, the two bit wide deserialized data streams consist of least significant bits B1 and B2, and most significant bit B1' and B2'. However, it is to be understood that the deserialized data streams may be of any width as is chosen by the system implementer, thus they may alternatively be three bits wide, four bits wide, and so on. In this exemplary embodiment, for input serial data stream 001, deserialized least significant bit B1 is provided as input to laser L1, and deserialized most significant bit B1' is provided as input to lasers L2 and L3. The optical outputs of L1 and L2/L3 are optically coupled to CH 1 optical fiber 011, creating an optical PAM-X signal in CH 1 optical fiber 011. In the embodiment depicted in FIG. 21C, the PAM-X signal in CH 1 optical fiber 011 is a PAM-4 signal. Likewise, for input serial data stream 001', least significant bit B2' is provided as input to laser L4, and most significant bit B2' is provided as input to lasers L5 and L6. The optical outputs of L4 and L5/L6 are then optically coupled to CH 2 optical fiber 012, creating an optical PAM-X signal in CH 2 optical fiber 012. In the embodiment depicted in FIG. 21C, the PAM-X signal in CH 2 optical fiber 012 is a PAM-4 signal. Optical fibers 011 and 012 are in optical communication with SDM multiplexer 003, which is selected to properly couple the optical outputs of optical fibers 011 and 012 into optical carrier fiber 004 such that CH 1 optical PAM-X signal and CH2 L1 optical PAM-X signal each propagate along optical carrier fiber 004 in separate SDM channels. Thus, the structure of SDM multiplexer 003 BCM may take the form of beam optics, optical fiber fixturing, other structures appropriate to couple the optical outputs of optical fibers 011 and 012 to optical carrier fiber 004 such that CH 1 optical PAM-X signal and CH2 L1 optical PAM-X signal are each optically coupled into optical carrier fiber 004 creating separate MDM, helical, or multi-core SDM channels in optical carrier fiber 004 representing CH 1 optical PAM-X signal and CH2 L1 optical PAM-X signal. Thus, there may be one or more optical SDM channels C propagating along optical carrier fiber 004. Optical carrier fiber 004 is optically coupled to SDM demux 013 at the detector end of the system. At the detector end of optical carrier fiber 004, the separate SDM channels optically exit the fiber H where they are de-multiplexed by SDM demux 013, resulting in a separate electrical output PAM-X data stream representing each serial input data stream; CH 1 PAM-X electrical signal I representing each serial input data stream 001, and CH2 PAM-X electrical signal I representing each serial input data stream 001'. Each of PAM-X signals I and I' are then input to CH 1 PAM-X demux 006a and CH 1 PAM-X demux 006b, respectively. PAM-X demuxs 006a and 006b operate to convert the incoming electrical PAM-X signal to a parallel output. Thus, in the exemplary embodiment depicted in FIG. 21C, CH 1 PAM-X demux 006a converts incoming electrical CH 1 PAM-X signal to a two bit wide parallel output consisting of recovered least significant bit B1 and most significant bit B1' which are then input to CH 1 serializer 007a. CH 1 serializer 007a converts the CH 1 two bit wide parallel data to a serial data stream 008a representing input serial data stream 001. Likewise, CH 2 PAM-X demux 006b converts incoming electrical CH 2 PAM-X signal to a CH 2 two bit wide parallel output consisting of recovered least significant bit B2 and most significant bit B2' which are then input to CH 2 serializer 007b. CH 2 serializer 007b converts the CH 2 two bit wide parallel data to a serial data stream 008b representing input serial data stream 002. It is to be understood that the exemplary system of the invention depicted in FIG. 21C is an example only, and that the system of the invention may comprise any number of channels of deserialized data B, B', By, By" and so on, supporting any bit mapping desired.

It is important to note that the PAM scheme of the invention not only applies to helix based SDM, but all forms of SDM in general. In the multicore approach, simply launching power into each core as its corresponding bit is high and directly coupling the fiber to a detector will achieve similar results. MDM based SDM has similar methodology, though a bit harder to manipulate due to how the modes are generally achieved. In all three instances, the special spatial properties allow the power to be properly coupled without destructive interference.

It can be seen in FIGS. 23A, 23B and 23C that the PAM multi-laser process of the invention is achievable without SDM for short distances.

This being the case, the multi-laser PAM embodiment, referred to henceforth as Modified PAM, may be achieved in any optical channel or process. Simulated results of this process can be seen in FIGS. 24 through 26.

Each of these results shows a very clear eye diagram for three key optical communication wavelengths. To test this design, three channels from a VCSEL QSFP+ (10 Gbps/channel) were launched into a fiber, where power of the added output beam created a 20 Gbps PAM-4 signal. The results of this experimental setup can be seen in FIG. 27.

This shows the validity of the Modified PAM process, and it can be applied to any SDM technique. This was tested by using two sets of the modified PAM-4 signal and launching them into a single carrier multimode fiber, which applies the single core SDM configuration. This will result in two distinct output channels that each carry its own PAM-4 signal. The first channel is launched along the z-axis of the fiber, and the second channels is launched at 10° with respect of z-axis for the fiber. A computer generated diagram of this setup can be seen in FIG. 28.

These signals were transmitted over a 10 meter fiber and directly connected to a digital communication analyzer for processing; however, it can be demonstrated for longer distances as well. The resultant output can be seen in FIGS. 29 and 30 for the inner and outer channels respectively. The inner channel resulted in a clear eye; however, the outer channel eye in FIG. 30 is very poor and requires more processing. Despite this, these FIGS. show that the overall design has merit.

PAM-WDM and PAM-WDM-SDM

In an embodiment of the invention, the same process is repeated with multiple wavelengths using wavelength division multiplexing. In example of this embodiment a 4 bits/symbol PAM 4 signal is combined with a four wavelength WDM system as shown in Table 1 below. Table 1 depicts a truth table of this power efficient PAM-4 SDM system combined with WDM channels. In this exemplary embodiment, sixteen combinations are needed to transmit 4 bits per symbol. A combination of the 4 levels offered by a PAM-4 system are employed in conjunction with 4 discrete wavelengths to achieve this goal. The bit combinations 0000, 0100, 1000 and 1100 may be represented any suitable combination of two or more wavelengths.

TABLE 1

Truth Table of SDM PAM-4 System with WDM

| Possible outcomes of a nibble | Wavelength to be used | PAM-4 Level |
|---|---|---|
| 0000 | $\lambda_2 + \lambda_3$ | Level-1 $\lambda_2 + \lambda_3$ |
| 0001 | $\lambda_1$ | 1 |
| 0010 |  | 2 |
| 0011 |  | 3 |
| 0100 | $\lambda_3 + \lambda_4$ | Level-1 $\lambda_3 + \lambda_4$ |
| 0101 | $\lambda_2$ | 1 |
| 0110 |  | 2 |
| 0111 |  | 3 |
| 1000 | $\lambda_4 + \lambda_1$ | Level-1 $\lambda_4 + \lambda_1$ |
| 1001 | $\lambda_3$ | 1 |
| 1010 |  | 2 |
| 1011 |  | 3 |
| 1100 | $\lambda_1 + \lambda_2$ | Level-1 $\lambda_1 + \lambda_2$ |
| 1101 | $\lambda_4$ | 1 |
| 1110 |  | 2 |
| 1111 |  | 3 |

This embodiment of the invention provides a larger number of bits per symbol and significant power savings over prior art systems that is be critical in many applications, such as data centers. In the embodiment, the architecture can be modified to add more wavelengths and levels to increase the number of bits per symbol. Furthermore, this embodiment may also comprise SDM architecture, as previously described herein, to enable parallel transmission of an entire byte.

Exemplary PAM-WDM and PAM-SDM-WDM embodiments of the invention, which result in higher capacity (i.e. faster) data networks, are depicted in FIGS. 31A and 31B, and 32A and 32B, respectively. These exemplary embodiments of the system of the invention may be realized, in part, using the QSFP28-CWDM4 wavelength division multiplexer and de-multiplexer modules which are currently available. Such wavelength division multiplexers receive, for example, four separate serial data inputs and convert each serial data input stream to an optical output data stream of independent wavelengths $\lambda 1$, $\lambda 2$, $\lambda 3$ and $\lambda 4$ all combined into a single fiber. As an example, $\lambda 1$ may be 1270 nm, $\lambda 2$ may be 1290 nm, $\lambda 3$ may be 1310 nm and $\lambda 4$ may be 1330 nm. However these are just example wavelengths and are not be construed as limiting the invention. The wavelength division de-multiplexers convert the four serial optical data streams at wavelengths $\lambda 1$, $\lambda 2$, $\lambda 3$ and $\lambda 4$, back to individual electrical serial outputs that replicate the four serial inputs to the wavelength division multiplexers.

Referring now to FIGS. 31A and 31B, a PAM-WDM embodiment of the invention is depicted in which four input serial data streams A1, A2, A3 and A4 are input to deserializers D1, D2, D3 and D4 respectively, converting each serial data stream to a two-bit wide parallel data output consisting of BX and BX'. Thus, for example, input serial data streams A1 is converted to a two-bit wide parallel data outputs B1 and B1', in which the least significant bit (LSB) is B1, and the most significant bit (MSB) is B1'. Each bit of the two-bit wide parallel data outputs is connected to the input of a WDM multiplexer 017, 018 and 019 as depicted in FIGS. 31A and 31B. As depicted in the figures, for WDM multiplexer 017, $\lambda 1$ input is the LSB of deserialized input data stream A1; $\lambda 2$ input is the LSB of deserialized input data stream A2; $\lambda 3$ input is the LSB of deserialized input data stream A3; and $\lambda 4$ input is the LSB of deserialized input data stream A4. The MSB of deserialized input data stream A1, B1', is input to the $\lambda 1$ input of WDM multiplexers 018 and 019; the MSB of deserialized input data stream A2, B2', is input to the $\lambda 2$ input of WDM multiplexers 018 and 019; the MSB of deserialized input data stream A3, B3', is input to the $\lambda 3$ input of WDM multiplexers 018 and 019; and the MSB of deserialized input data stream A4, B4', is input to the $\lambda 4$ input of WDM multiplexers 018 and 019. Each of the optical outputs of WDM multiplexers WDM1, WDM2 and WDM3, which each comprise their independent $\lambda 1$, $\lambda 2$, $\lambda 3$ and $\lambda 4$ optical signals, are incoherently combined and launched into optical carrier fiber 004 at BCM 003 which may be any combination of beam combining optics, SDM multiplexer or any other structure that is known in the art for combining and launching optical energy from one fiber into another. The incoherent combining of the $\lambda 1$, $\lambda 2$, $\lambda 3$ and $\lambda 4$ signals in optical carrier fiber 004 results in four individual PAM-X (in the embodiment shown, PAM-4) signals that propagate along optical carrier fiber 004 separated by wavelength $\lambda 1$, $\lambda 2$, $\lambda 3$ and $\lambda 4$. Optical carrier fiber 004 is coupled to WDM de-multiplexer 020 that operates to separate each the optical wavelength $\lambda 1$, $\lambda 2$, $\lambda 3$ and $\lambda 4$ into four output electrical PAM-X signals (in the embodiment shown, PAM-4) each signal corresponding to the PAM-X optical signals carried by $\lambda 1$, $\lambda 2$, $\lambda 3$ and $\lambda 4$ in optical carrier fiber 004. Each of the four electrical PAM-X signals representing the optical signals at $\lambda 1$, $\lambda 2$, $\lambda 3$ and $\lambda 4$ are then input to a PAM de-multiplexer P1, P2, P3, or P4 respectively, which results in a two bit wide parallel output corresponding to B1 and B1'; B2 and B2'; B3 and B3'; and B4 and B4', respectively. Each of these two bit wide parallel data streams are then input into serializers S1, S2, S3 or S4, respectively, resulting in output serial data streams that replicate input serial data streams A1, A2, A3 and A4. Using this embodiment of the invention, the bit mapping of Table 1 is achieved. In order to streamline the discussion below and the figures regarding the PAM-WDM-SDM embodiments of the invention, de-serializers D1-DX and WCM multiplexers 017, 018, and 019 are collectively referred to as a block as "E/O MUX" as shown in FIG. 31B. Likewise, PAM demuxs P1-PX and serializers S1-SX are referred to collectively as "E/O DEMUX" as shown in FIG. 31B.

Referring now to FIGS. 32A and 32B, a PAM-WDM-SDM embodiment of the invention is depicted in which a plurality of the prior-described PAM-WDM systems (see FIGS. 31A and 31B) are used in combination with SDM, such that higher data capacity systems are achieved. In the embodiment shown in FIGS. 32A and 32B a series of serial data inputs A1-A4 are input to the de-serializers of E/O MUX 1, where they are converted to two bit parallel data streams and converted to WDM optical signals WDM1, WDM2, and WDM3 as described above. Optical signals WDM1, WDM2, and WDM3 are then combined incoherently and launched into optical fiber 050 at BCM 003, which may be any combination of beam combining optics, SDM multiplexer or any other structure that is known in the art for combining and launching optical energy from one fiber into another. Likewise, a series of serial data inputs A1'-A4' are input to the de-serializers of E/O MUX 2, where they are converted to two bit parallel data streams and converted to WDM optical signals WDM1', WDM2', and WDM3' as described above. Optical signals WDM1', WDM2', and WDM3' are then combined incoherently and launched into optical fiber 051 at BCM 003, which may be any combination of beam combining optics, SDM multiplexer or any other structure that is known in the art for combining and launching optical energy from one fiber into another. The optical signals propagating along optical fibers 050 and 051 are next each launched into optical carrier fiber 004 through SDM multiplexer 021, which is selected to properly couple the optical outputs of optical fibers 050 and 051 into optical carrier fiber 004 such that the optical signals from optical fibers 050 and 051 each propagate along optical carrier fiber 004 in separate SDM channels. Thus, the structure of SDM multiplexer 003 BCM may take the form of beam optics, optical fiber fixturing, or other structures appropriate to couple the optical outputs of optical fibers 050 and 051 to optical carrier fiber 004 such that the optical signals from optical fibers 050 and 051 are each optically coupled into optical carrier fiber 004 creating separate MDM, helical, or multicore SDM channels in optical carrier fiber 004. Optical carrier fiber 004 is optically coupled to SDM demux 013 at the detector end of the system. At the detector end of optical carrier fiber 004, the separate SDM channels optically exit optical carrier fiber 004 where they are de-multiplexed by SDM demux 013, resulting in separate optical signals 52 and 53, where optical signal 52 corresponds to optical signal 50, and optical signal 53 corresponds to optical signal 51. Optical signals 52 and 53 are then input to WDM demux 20 and WDM demux 20', respectively, which convert the optical signals to electricals signals. WDM demux 20 produces four electrical outputs that correspond to signals PAM-X signals λ1-PAM, λ2-PAM, λ3-PAM and λ4-PAM (in this exemplary, non-limiting embodiment, a PAM-4 system is depicted as a representative embodiment, but the system of the invention may comprise any number of PAM levels). The PAM demuxs and serializers of E/O DEMUX 1 then operate to produce serial data outputs Serial 1 Out-Serial 4 Out, which are representative of input serial data streams A1-A4, respectively. Likewise, WDM demux 21 produces four electrical outputs that correspond to signals PAM-X signals λ1'-PAM, λ2'-PAM, λ3'-PAM and λ4'-PAM (in this exemplary, non-limiting embodiment, a PAM-4 system is depicted as a representative embodiment, but the system of the invention may comprise any number of PAM levels). The PAM demuxs and serializers of E/O DEMUX 2 then operate to produce serial data outputs Serial 1' Out-Serial 4' Out, which are representative of input serial data streams A1'-A4', respectively. The PAM-WDM-SDM system of the invention is extendable up to z sets of serial data inputs, where z may be any number.

In an embodiment of the invention, the invention comprises a plurality of WDM channels used in combination with a plurality of SDM channels that to form a PAM-X architecture. In one exemplary embodiment, four different PAM-4 modulated WDM channels are launched into a carrier multimode fiber in a desired fashion to generate four separate concentric donut shaped rings or 2 separate concentric donut shaped rings carrying four PAM-4 signals at the fiber-end, as depicted in FIG. 33.

Each WDM channel may have the same modified PAM-4 modulation as described in the system above. Each PAM-4 modulated wavelength is launched into the SDM system. The system design may be implemented in a fashion that minimizes the system complexity and power consumption.

Figure 34B:
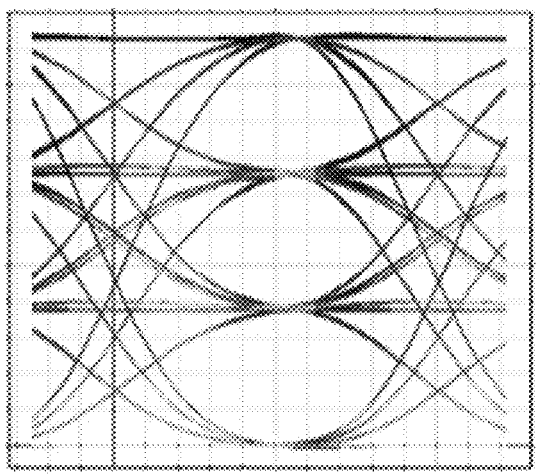
Figure 34C:
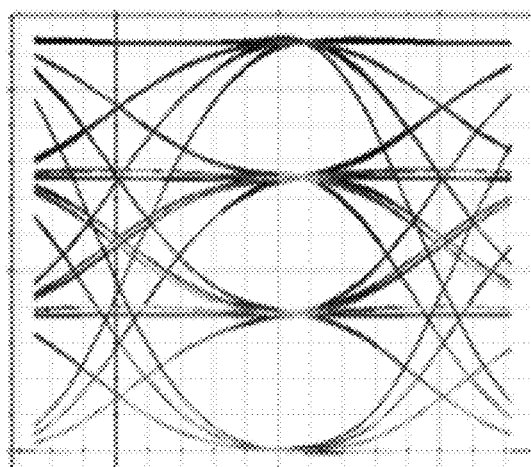
Figure 34D:
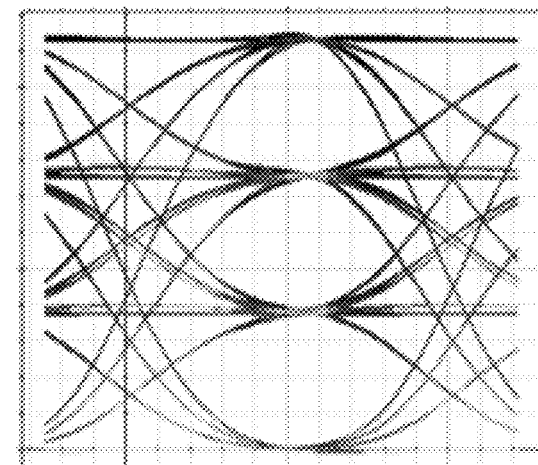

Each of these results shows a very clear eye diagram for all four wavelengths. To test this design, four channels from three QSFP28 (25 Gbps/channel) modules were launched into an optical combiner, where the power of the added output beam created a 50 Gbps PAM-4 signal for each wavelength. Then the four wavelengths, having PAM-4 structure, are separated via CWDM demux. The simulated results of this process can be seen in FIGS. 34A, 34B, 34C and 34D for each wavelength (1270 nm, 1290 nm, 1310 nm, and 1330 nm respectively) and experimental results can be seen in FIGS. 35 and 36.

These PAM-4 signals were transmitted over a 5-meter long fiber and directly connected to a digital communication analyzer for signal processing; however, it can be demonstrated for longer distances as well. After the PAM-4 signal generation, SDM architecture was applied to the signals and the results of these 2 channels experimental setup were given in FIG. 37 and FIG. 38 for the center and outer channel respectively.

The PAM-4 structure is even obtained from a single QSFP28 CWDM-4 module itself when three channels from the module are launched into an optical fiber. The power from each wavelength will be incoherently added and form a 50 Gbps PAM-4 signal. The system has been tested up to 300-meter-long fiber and clear eye diagram are obtained as seen in FIG. 39.

In this embodiment of the invention, every four bits (nibble) of incoming data stream are carried by four different PAM-4 modulated wavelengths. The outcomes having '00' in their 2 most significant bits are carried by the first wavelength, the ones having most significant bits of '01' are carried by the second wavelength, '10' are sent by the third wavelength, and '11' are sent by the fourth wavelength. Since PAM-4 provides 4 distinct levels, all possible outcomes will be matched with the PAM-4 modulated wavelengths except for the bits having '00' in their 2 least significant bits. Since there will be no signal coming in those conditions, the adjacent 2 wavelengths with 1-level will be sent to avoid the ambiguity as explained in Table 1. This process may be programmable in a Field Programmable Gate Array (FPGA) platform.

The system may seem like an inefficient data-rate-wise; however it has many advantages including having even lesser power consumption and heat-related distortion since it encrypts the data and sends only 1-wavelength at a time in most cases.

FIGS. 34A, 34B, 34C and 34D depict PAM-4 simulated eye diagrams of each WDM channels (1270 nm, 1290 nm, 1310 nm, and 1330 nm respectively).

FIG. 35 depicts PAM-2, PAM-3 and PAM-4 measured eye diagrams.

FIG. 36 depicts a reference PAM-4 input signal eye diagram with WDM channels.

Any embodiment of the invention may be realized in QFSP packaging utilizing, for example, silicon photonics.

The invention thus comprises a system, apparatus and method for providing a Modified PAM communication system, which may be an optical fiber-based communication system, which may use multiple laser sources to generate each PAM amplitude level. It can be applied separately or in conjunction with another modulation system such as SDM, MDM, TDM, WDM or other communication systems. A PAM-4 embodiment of the invention increases the data rate by a factor of two, but more complicated embodiments of the invention comprising a higher number of lasers can be utilized to generate higher efficiency implementations of the invention. For example, in an embodiment, a 25 Gbps NRZ signal will give 50 Gbps PAM-4 signal and higher laser systems can generate PAM-8 or PAM-16 for 75 and 100 Gbps systems respectively. These can be further applied to SDM systems to generate higher data rates equivalent to the number of SDM channels multiplied by the PAM efficiency.

In any of the embodiments of the invention, incoherent addition of optical intensities of laser sources is one aspect of the invention. Hence the method and apparatus of the invention may be practiced by using two laser sources in which one laser source is operating at 2× power (due to higher operating current or higher inherent laser power or selective wavelength sensitivity of the detector etc.) and the second laser source is operating at 1× power. Similarly, in an embodiment, the method and apparatus of the invention may also be practiced by using two laser sources operating at similar power levels where an attenuator or a polarizer or a combination of both or some similar techniques are used to reduce the intensity of one of the laser to effectively half of the original intensity.

In any of the embodiments of the invention, the laser forming the PAM4/PAM-X signals and the simplified PAM4/PAM-X system may be integrated into optical transceivers such as XFP, TXFP, SFP, QSFP, CFP etc., using optical, semiconductor, photonics, silicon photonics or other appropriate means of generating or integrating laser sources into the transceiver package, and then appropriately guiding and coupling them to a n optical transmission medium.

The invention also comprises the methods of using the system and apparatus for achieving multiple bits per symbol described herein. In an embodiment, the invention comprises a method for PAM-X modulation of an optical communication system, where X is the number of PAM levels, comprising the steps of 1) receiving an input serial binary data stream; 2) converting the input serial binary data stream to n independent parallel binary data streams numbered sequentially in order from Least Significant Bit to Most Significant Bit such that the Least Significant Bit is numbered 1 and the Most Significant Bit is numbered n; providing a plurality of x optical sources for converting serial binary electrical data to binary serial optical data, each of the optical sources producing an optical signal output; and wherein:

$$x = \sum_{i=1}^{n} 2^{i-1}$$

and wherein each of the n parallel binary serial data streams are each in communication with w of said x optical sources according to the relation, beginning from Least Significant Bit to Most Significant Bit:

$$w = \sum_{i=0}^{n-1} 2^i$$

incoherently combining the outputs of said x optical sources forming a combined PAM-X optical signal of X bits per symbol when the optical source output signals are coupled into an optical carrier fiber, said optical carrier fiber supporting propagation of the combined optical signal to an output end of said optical carrier fiber; receiving the combined PAM-X optical signal of X bits per symbol by an optical detector to recover a combined PAM-X signal of X bits per symbol electrical signal proportional to said combined PAM-X optical signal of X bits per symbol; de-multiplexing the combined PAM-X signal of X bits per symbol electrical signal to recover n independent parallel binary data streams; and serializing the recovered n independent parallel binary data streams to provide a single serial data stream that is a replica of the serial input data stream. In an embodiment, the method of the invention includes systems wherein X=4 and n=2. In an embodiment, the optical carrier fiber is selected from the group consisting of a single core multimode fiber, a multicore multimode fiber, a single core single mode fiber, a multicore single mode fiber, a free space optical channel, a water based optical channel, an optical media that is capable of supporting propagation of said optical signal output.

While specific embodiments of the invention are described herein, it is understood that the system, apparatus and method of the invention are extendable to other orders of modulation, and may be combined with other modulation systems not described herein, and are therefore within the scope of the claimed invention. Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus, the scope of the invention should be determined by the appended claims and their legal equivalents, and not merely by the preferred examples or embodiments given.

What is claimed is:
1. A multi-level PAM-X/WDM communication system, where X is the number of PAM levels per wavelength, comprising:
  a plurality of j serial to parallel convertors each comprising an input port for receiving an input serial data stream of binary data, said serial to parallel convertors converting said input serial stream of binary data into n parallel binary serial output data streams, numbered sequentially in order from Least Significant Bit to Most Significant Bit such that the Least Significant Bit is numbered 1 and the Most Significant Bit is numbered n, each of the n parallel binary serial output data streams is split into k output data streams;

wherein $k=2^{i-1}$, where $i=1, \ldots, n$, in order from Least Significant Bit to Most Significant Bit, and the total output data streams from each serial to parallel convertor is $$l = \sum_{i=1}^{n} 2^{i-1}$$

where the l total output data streams from one serial to parallel convertor are converted to optical signals having same discrete WDM wavelength, and different serial to parallel convertors correspond to different discrete WDM wavelengths;

a plurality l of multichannel wavelength division multiplexers that each outputs a WDM combined output optical signal that comprises optical signals at each discrete WDM wavelength;

each wavelength division multiplexer having a plurality of j inputs, one input for each WDM wavelength, each of said inputs receiving one of said l total output data streams from one of said serial to parallel convertors;

wherein each of said optical signals at each discrete WDM wavelength corresponds to one of said l total output data streams from one of said serial to parallel convertors;

wherein each of said WDM outputs is optically coupled to an input end of an optical carrier fiber;

wherein each of said WDM outputs are incoherently combined into a combined PAM-X/WDM optical signal of X bits per symbol per discrete WDM wavelength when said WDM outputs are coupled into said optical carrier fiber, said optical carrier fiber supporting propagation of said combined PAM-X/WDM optical signal to an output end of said optical carrier fiber;

a WDM de-multiplexer having an input port in optical communication with an output end of said optical carrier fiber, converting said combined PAM-X/WDM optical signal to a plurality of electrical signals, one for each WDM wavelength, each electrical signal corresponding to the PAM-X/WDM optical signal of X bits per symbol per discrete WDM wavelength present in the combined PAM-X/WDM optical signal, and presenting an electrical signal corresponding to the PAM-X/WDM optical signal of X bits per symbol per discrete WDM wavelength for each WDM wavelength as an electrical output;

a plurality of PAM-X de-multiplexers, one for each discrete WDM wavelength, each PAM-X de-multiplexer having an input in communication with one of the outputs of said WDM de-multiplexer such that each of said PAM de-multiplexers receives one of the electrical signals corresponding to the PAM-X/WDM optical signal of X bits per symbol per discrete WDM wavelength for each WDM wavelength that is output from said WDM de-multiplexer, each PAM de-multiplexers converting said its input PAM-X/WDM signal of X bits per symbol to n parallel binary serial data streams; and a plurality of serializers, wherein said PAM-X de-multiplexer is in communication with a unique serializer, said unique serializer converting said n parallel binary serial data streams to a single serial data stream that is a replica of the serial input data stream.

2. The multi-level PAM-X/WDM communication system of claim 1, where X=4, n=2, the number of deserializers j=4, the number of wavelength division multiplexers l=3, and the number of discrete WDM wavelengths=4.

3. The multi-channel communication system of claim 1, in which the optical carrier fiber is selected from the group consisting of a single core multimode fiber, a multicore multimode fiber, a single core single mode fiber, a multicore single mode fiber, a free space optical channel, a water based optical channel, an optical media that is capable of supporting propagation of said optical signal output.

4. A multi-level PAM-X/WDM/SDM communication system, where X is the number of PAM levels, comprising:

a first plurality of j serial to parallel convertors each comprising an input port for receiving an input serial data stream of binary data, said serial to parallel convertors converting said input serial stream of binary data into n parallel binary serial output data streams, numbered sequentially in order from Least Significant Bit to Most Significant Bit such that the Least Significant Bit is numbered 1 and the Most Significant Bit is numbered n, each of the n parallel binary serial output data streams is split into k output data streams;

wherein $k=2^{i-1}$, where $i=1, \ldots, n$, in order from Least Significant Bit to Most Significant Bit, and the total output data streams from each serial to parallel convertor is $$l = \sum_{i=1}^{n} 2^{i-1}$$

where the l total output data streams from one serial to parallel convertor are converted to optical signals having same discrete WDM wavelength, and different serial to parallel convertors correspond to different discrete WDM wavelengths;

a first plurality of l multichannel wavelength division multiplexers that each outputs a WDM combined output optical signal that comprises optical signals at each discrete WDM wavelength;

each wavelength division multiplexer having a plurality of j inputs, one input for each WDM wavelength, each of said inputs receiving one of said l total output data streams from one of said serial to parallel convertors;

wherein each of said optical signals at each discrete WDM wavelength corresponds to one of said l total output data streams from one of said serial to parallel convertors;

wherein each of said WDM outputs is optically coupled to an input end of a first optical carrier fiber;

wherein each of said WDM outputs are incoherently combined into a first combined PAM-X/WDM optical signal of X bits per symbol per discrete WDM wavelength when said WDM outputs are coupled into said first optical carrier fiber, said first optical carrier fiber supporting propagation of said first combined PAM-X/WDM optical signal to an output end of said first optical carrier fiber;

a second plurality of j' serial to parallel convertors each comprising an input port for receiving an input serial data stream of binary data, said serial to parallel convertors converting said input serial stream of binary data into n parallel binary serial output data streams, numbered sequentially in order from Least Significant Bit to Most Significant Bit such that the Least Significant Bit is numbered 1 and the Most Significant Bit is numbered n, each of the n parallel binary serial output data streams is split into k output data streams;

wherein k=$2^{i-1}$, where i=1, . . . , n, in order from Least Significant Bit to Most Significant Bit, and the total output data streams from each serial to parallel convertor is $$l = \sum_{i=1}^{n} 2^{i-1}$$

where the l total output data streams from one serial to parallel convertor are converted to optical signals having same discrete WDM wavelength, and different serial to parallel convertors correspond to different discrete WDM wavelengths;

a second plurality of l multichannel wavelength division multiplexers that each outputs a WDM combined output optical signal that comprises optical signals at each discrete WDM wavelength;

each wavelength division multiplexer having a plurality of j' inputs, one input for each WDM wavelength, each of said inputs receiving one of said l total output data streams from one of said serial to parallel convertors;

wherein each of said optical signals at each discrete WDM wavelength corresponds to one of said l total output data streams from one of said serial to parallel convertors;

wherein each of said WDM outputs is optically coupled to an input end of a second optical carrier fiber;

wherein each of said WDM outputs are incoherently combined into a second combined PAM-X/WDM optical signal of X bits per symbol per discrete WDM wavelength when said WDM outputs are coupled into said second optical carrier fiber, said second optical carrier fiber supporting propagation of said second combined PAM-X/WDM optical signal to an output end of said second optical carrier fiber;

wherein said first and second optical carrier fibers are in optical communication with an SDM multiplexer coupled to an SDM carrier fiber such that said first combined PAM-X/WDM optical signal of X bits per symbol per discrete WDM wavelength is launched into said SDM carrier fiber in a first unique SDM channel, and wherein said second combined PAM-X/WDM optical signal of X bits per symbol per discrete WDM wavelength is launched into said SDM carrier fiber in a second unique SDM channel;

an SDM de-multiplexer in optical communication with an output end of said SDM carrier fiber, said SDM de-multiplexer producing a first output comprising an optical signal corresponding to said first combined PAM-X/WDM optical signal of X bits per symbol per discrete WDM wavelength; and said SDM de-multiplexer producing as a second output an optical signal corresponding to said second combined PAM-X/WDM optical signal of X bits per symbol per discrete WDM wavelength;

a first WDM de-multiplexer having an input port in optical communication with said first output of said SDM de-multiplexer, converting said first combined PAM-X/WDM optical signal of X bits per symbol per discrete WDM wavelength to a plurality of electrical signals, one for each WDM wavelength, each electrical signal corresponding to the PAM-X/WDM optical signal of X bits per symbol per discrete WDM wavelength present in the first combined PAM-X/WDM per discrete WDM wavelength, and presenting an electrical signal corresponding to the first combined PAM-X/WDM optical signal of X bits per symbol per discrete WDM wavelength for each WDM wavelength as an electrical output;

a second WDM de-multiplexer having an input port in optical communication with said second output of said SDM de-multiplexer, converting said second combined PAM-X/WDM optical signal of X bits per symbol per discrete WDM wavelength to a plurality of electrical signals, one for each WDM wavelength, each electrical signal corresponding to the second PAM-X/WDM optical signal of X bits per symbol per discrete WDM wavelength present in the SDM carrier fiber, and presenting an electrical signal corresponding to the second combined PAM-X/WDM optical signal of X bits per symbol per discrete WDM wavelength for each WDM wavelength as an electrical output;

a first plurality of PAM-X de-multiplexers in communication with said first WDM de-multiplexer, one for each discrete WDM wavelength, each PAM-X de-multiplexer having an input in communication with one of the outputs of said first WDM de-multiplexer such that each of said PAM-X de-multiplexers receives one of the electrical signals corresponding to the PAM-X/WDM optical signal of X bits per symbol per discrete WDM wavelength for each WDM wavelength that is output from said WDM de-multiplexer, each PAM de-multiplexers converting said its input PAM-X/WDM signal of X bits per symbol to n parallel binary serial data streams; and a second plurality of PAM-X de-multiplexers in communication with said second WDM de-multiplexer, one for each discrete WDM wavelength, each PAM-X de-multiplexer having an input in communication with one of the outputs of said second WDM de-multiplexer such that each of said PAM-X de-multiplexers receives one of the electrical signals corresponding to the PAM-X/WDM optical signal of X bits per symbol per discrete WDM wavelength for each WDM wavelength that is output from said WDM de-multiplexer, each PAM de-multiplexers converting said its input PAM-X/WDM signal of X bits per symbol to n parallel binary serial data streams; and a first plurality of serializers, wherein said first PAM-X de-multiplexer is in communication with a unique serializer, said unique serializer converting said n parallel binary serial data streams to a single serial data stream that is a replica of the serial input data stream; and a second plurality of serializers, wherein said second PAM-X de-multiplexer is in communication with a unique serializer, said unique serializer converting said n parallel binary serial data streams to a single serial data stream that is a replica of the serial input data stream.

5. The multi-channel communication system of claim 4 where X=4 and n=2.

6. The multi-channel communication system of claim 5 in which the SDM modulation is further defined as being selected from the group consisting of MDM, helical SDM, or multi-core SDM.

7. The multi-channel communication system of claim 4, in which the SDM optical carrier fiber is selected from the group consisting of a single core multimode fiber, a multi-core multimode fiber, a single core single mode fiber, a multicore single mode fiber, a free space optical channel, a water based optical channel, an optical media that is capable of supporting propagation of said optical signal output.

8. The multi-channel communication system of claim 7 in which the SDM modulation is further defined as being selected from the group consisting of MDM, helical SDM, or multi-core SDM.

9. The multi-channel communication system of claim 4 in which the SDM modulation is further defined as being selected from the group consisting of MDM, helical SDM, or multi-core SDM.

\* \* \* \* \*